United States Patent

Takeda et al.

[11] Patent Number: 5,978,726
[45] Date of Patent: Nov. 2, 1999

[54] DRIVING TORQUE CONTROL METHOD AND APPARATUS FOR A FOUR-WHEEL DRIVE VEHICLE

[75] Inventors: Masayoshi Takeda, Kariya; Hideaki Suzuki, Anjo, both of Japan

[73] Assignee: Denso Corporation, Kariya, Japan

[21] Appl. No.: 08/932,180

[22] Filed: Sep. 17, 1997

[30] Foreign Application Priority Data

Sep. 18, 1996 [JP] Japan .................................. 8-246393
Sep. 20, 1996 [JP] Japan .................................. 8-250166
Aug. 26, 1997 [JP] Japan .................................. 9-229489

[51] Int. Cl.⁶ .............................. B60K 28/16; B60T 8/32
[52] U.S. Cl. ............................... 701/84; 701/83; 701/85; 701/86; 180/197; 303/143
[58] Field of Search .................................. 701/84, 89, 83, 701/85, 81, 74; 180/197; 303/139, 143, 145, 169, 190

[56] References Cited

U.S. PATENT DOCUMENTS

| | | | |
|---|---|---|---|
| 4,766,972 | 8/1988 | Takata et al. | 180/197 |
| 4,840,247 | 6/1989 | Kashihara et al. | 180/249 |
| 4,946,015 | 8/1990 | Browalski et al. | 477/186 |
| 4,967,869 | 11/1990 | Nagaoka et al. | 180/244 |
| 5,083,631 | 1/1992 | Nakayama et al. | 180/197 |
| 5,112,114 | 5/1992 | Cogswell, II et al. | 303/113.2 |
| 5,634,699 | 6/1997 | Ichikawa et al. | 303/150 |
| 5,685,619 | 11/1997 | Brown | 303/145 |
| 5,850,616 | 12/1998 | Matsuno et al. | 701/82 |

FOREIGN PATENT DOCUMENTS

| | | |
|---|---|---|
| 60-248440 | 12/1985 | Japan . |
| 63-134346 | 6/1988 | Japan . |
| 6-99756 | 4/1994 | Japan . |
| 6-305338 | 11/1994 | Japan . |

*Primary Examiner*—Michael J. Zanelli
*Attorney, Agent, or Firm*—Pillsbury Madison & Sutro LLP

[57] ABSTRACT

A wheel speed differential with another wheel of each of several wheels is determined as a parameter for brake-adjustment use, and driving torque conveyed respectively from an engine to the several wheels is adjusted by braking torque determined on a basis of the parameter for brake-adjustment use so as to restrain the wheel-speed differential. In such a driving torque control, the engine output is reduced if the braking torque is excessive. Therefore, load to the brake apparatus and drivetrain caused by engine output can be reduced. Thus, deterioration of the durability of the brake apparatus and drivetrain can be prevented.

47 Claims, 12 Drawing Sheets

DRIVING TORQUE CONTROL METHOD AND APPARATUS FOR A FOUR-WHEEL DRIVE VEHICLE

CROSS REFERENCE TO RELATED APPLICATION

This application is based upon and claims the benefit of priority from the prior Japanese Patent Applications No. H. 8-246393 filed on Sep. 18, 1996 and No. H. 8-250166 filed on Sep. 20, 1996, the contents of which are incorporated herein by reference.

BACKGROUND OF THE INVENTION

1. Field of the Invention

The present invention relates to a driving torque control apparatus, driving torque control method, and storage medium to store a program relating to this driving torque control method, for a four-wheel drive vehicle.

2. Related Art

Conventionally, four-wheel drive vehicles which can move on a bad condition road such as an unpaved road or a snowy road by transmitting driving torque generated by an engine to four wheels are put to practical use.

In the conventional four-wheel drive vehicle, if one of the four wheels spins, driving torque cannot be transmitted from the engine to the other wheels. As a result, the vehicle cannot have enough tractive power to advance.

In other words, in the conventional four-wheel drive vehicle, driving torque from the engine is distributed to driveshafts for front and rear wheels through a center differential gear, driving torque distributed to the front-wheel driveshaft is further distributed to the front-left and front-right wheels through a front differential gear, and driving torque distributed to the rear-wheel driveshaft is further distributed to the rear-left and rear-right wheels through a rear differential gear. Therefore, is any one of the wheels spins, driving torque is not transmitted to the other wheel due to the action of each of the differential gears.

As a technique to solve such a problem, Japanese Patent Application Laid-Open No. (JP-A-) 60-248440 discloses an apparatus which detects slippage of each of a plurality of wheels and provides braking torque to a wheel falling into a spinning state. According to this technique, wheels are prevented from spinning, whereby driving torque is transmitted to non-spinning wheels even when one of the wheels spins. That is, driving torque transmitted to the spinning wheel is reduced by the brake, and the rotational speed differential among the several wheels is restrained.

However, because the rotational speed differential (hereinafter termed simply "speed differential") is adjusted in its entirety by braking torque, the greater is the engine output, the larger is the load applied to the brake apparatus. For this reason, wear and heating of the brake pad in the brake apparatus and frequency of operation of the actuator for adjusting hydraulic pressure become high, and problems in the durability of the brake apparatus become a concern. Further, negative effects on the drivetrain (propeller shaft, differential gear, and the like) also are a concern.

An apparatus to cause output of an engine in a four-wheel drive vehicle to be reduced on a basis of a slip ratio is already known (JP-A-2-81721). However, this art performs output control of the engine in order to maintain running stability of the vehicle in a case where the slip ratio of the several wheels is calculated from a differential between vehicle-body speed and wheel speed, and a combination of wheels whereat the slip ratio thereof is a predetermined value or more is a special combination (specifically, one of the three combinations of front-left and front-right wheels, front-left and rear-left wheels, and front-right and rear right wheels).

For this reason, in a case such as where spinning occurs at the wheels of a combination differing from the above-described combinations, reduction of engine output is not performed, and there exists a chance that excessive load may be applied to the brake apparatus or the drivetrain.

Furthermore, in a four-wheel drive vehicle, engine braking due to release of the accelerator by the driver is applied to the four wheels. In a case of a road surface having a low friction coefficient $\mu$, or in a case of a road surface having patchy high and low portions of the friction coefficient $\mu$, the rotational speed of wheels on a road surface having a low friction coefficient $\mu$ declines from the rotational speed of the other wheels. As a result, the wheels on a road surface having a low friction coefficient $\mu$ are apt to lock, and a speed differential among the wheels occurs.

In a driving torque control system to reduce wheel spinning by braking as has been described above, in a case where a speed differential exists among the wheels, braking torque is applied to the wheel having the larger rotational speed, and differential limiting is performed. For this reason, the brakes are applied to the wheels which are not apt to spin, the so-called gripping wheels. Consequently, there exists a chance of causing a greater speed reduction than foreseen to occur, irrespectively of the driver merely having released the accelerator pedal.

Additionally, it is considered also that vehicle behavior may become unstable in a case where the gripping wheel loses its grip as a result of this driving torque control.

Even in a case where the driver has braked gently, these phenomena may cause speed reduction exceeding the braking operation of the driver due to driving torque control, and there exists a chance that instability in vehicle behavior may occur.

SUMMARY OF THE INVENTION

It is a first object of the present invention to prevent an engine output from applying excessive load to a brake apparatus and drivetrain and reducing durability thereof. Specifically, it is a first object to reduce load thereof without sacrificing acceleration performance.

Furthermore, it is a second object of the present invention to prevent deceleration not desired by a driver and to stably maintain vehicle behavior by applying braking torque to a wheel having a high rotational speed in a case where a speed differential has occurred among the wheels.

To achieve the first object described above, in a method for controlling driving torque of a four-wheel drive vehicle according to the present invention, a wheel behavior differential with another wheel of each of several wheels of a four-wheel drive vehicle is determined as a parameter for brake-adjustment use, and driving torque conveyed respectively from the engine to the several wheels is adjusted by braking torque on a basis of the parameter for brake-adjustment use so as to restrain the foregoing wheel-behavior differential. In such a driving torque control, the engine output is reduced if the braking torque is excessive.

In this way, the present invention apprehends the fact that braking torque is excessive, and causes engine output to be reduced. Load to the brake apparatus and drivetrain caused by engine output which cannot sufficiently be prevented in a case where engine output is reduced when the wheels of a special combination have a high slip ratio as in the related art can sufficiently be reduced by the present invention. Therefore, deterioration of the durability of the brake apparatus and drivetrain can be prevented.

This excessive braking torque may be determined by measuring braking torque from a pressure such as brake-fluid pressure, or for example wheel-behavior differentials at all wheels may be calculated as a parameter for engine-output adjustment use, and excessive braking torque may be determined on a basis of this parameter for engine-output adjustment use.

That is to say, adjustment of braking torque at the individual wheels is performed on a basis of the above-described parameter for brake-adjustment use. Consequently, determination of excessive braking torque can be made on a basis of the wheel-behavior differentials at all wheels. Moreover, because engine output directly affects the driving torque of all wheels, it can be determined that braking torque at one or another of the wheels is excessive and reduction of engine output is required by determination of excessive braking torque on a basis of the wheel-behavior differentials at all wheels.

To indicate this more specifically, for example in a case where the above-mentioned parameter for brake-adjustment use has become larger than a predetermined determination value for brake-adjustment use at each of the several wheels, braking torque is adjusted in accordance with the differential between the foregoing parameter for brake-adjustment use and the foregoing determination value for brake-adjustment use. At this time, the foregoing braking torque is determined to be excessive in a case where the above-described parameter for engine-output adjustment use has become larger than a predetermined determination value for engine-output adjustment use larger than the above-described parameter for brake-adjustment use, and by adjusting the foregoing engine output in accordance with the differential between the parameter for engine-output adjustment use and the determination value for engine-output adjustment use, the engine output can be reduced in a case where braking torque is large and deterioration in the durability of the brake apparatus and the drivetrain can be prevented.

Additionally, because the determination value for engine-output adjustment use is greater than the determination value for brake-adjustment use, adjustment to cause engine output to be reduced is performed in a case wherein the wheel-behavior differentials at all wheels have become still larger than the state of wheel-behavior differentials whereat adjustment of braking torque is performed. When this determination value for engine-output adjustment use has been set at a value sufficiently high that appropriate driving torque is obtained, it becomes possible to reduce the load of the brake apparatus and drivetrain without sacrificing acceleration performance.

Herein, when a differential between maximum speed and minimum speed among all wheels is utilized as the above-described parameter for engine-output adjustment use, engine-output adjustment that encompasses all wheels becomes possible.

Aside from this, in a case where a determination value for brake-adjustment use has been established individually for each wheel, for example, in a case where the determination values for brake-adjustment use on the rear-wheel side have been set at a small value for the purpose of enhancing vehicle running stability or the like, the determination value for engine-output adjustment use may be set to be larger by a predetermined value than the determination value for brake-adjustment use established for the wheel of maximum speed, in order to appropriately correspond to a braking state of the individual wheels. That is to say, when the determination value for brake-adjustment use is small, the determination value for engine-output adjustment use may be established to be small in correspondence thereto, and when the determination value for brake-adjustment use is large, the determination value for engine-output adjustment use may be established to be large in correspondence thereto.

Additionally, the above-described parameter for engine-output adjustment use may be equivalent to for example the parameter for brake-adjustment use at the wheel of maximum speed, other than the wheel behavior differentials at all wheels (for example the differential between maximum speed and minimum speed among all wheels). That is to say, the wheel-behavior differential may be employed as parameters for both brake-adjustment use and engine-output adjustment use, and the determination values may be changed respectively for brake-adjustment use and for engine-output use. In this case, because the parameter for brake-adjustment use at the wheel of maximum speed is used as the parameter for engine-output adjustment use, output control of the engine caused to be in conformity with a wheel at which excessive braking torque occurs becomes possible, and control of higher accuracy becomes possible.

A value which is for example the differential between the speed of a wheel itself and the speed of the other wheel on the same side longitudinally, plus a value obtained by subtracting the average speed of the two wheels on opposite sides longitudinally from the average of the foregoing wheel itself and the foregoing other wheel, can be employed as the foregoing parameter for brake-adjustment use. In this way, the wheel-behavior differential of each wheel with another wheel can be obtained. This can be expressed for example as in the following equations (1) through (4).

$$\Delta VFL = VWFL - VWFR + ((VWFL + VWFR)/2 - (VWRL + VWRR)/2) \quad (1)$$

$$\Delta VFR = VWFR - VWFL + ((VWFL + VWFR)/2 - (VWRL + VWRR)/2) \quad (2)$$

$$\Delta VRL = VWRL - VWRR + ((VWRL + VWRR)/2 - (VWFL + VWFR)/2) \quad (3)$$

$$\Delta VRR = VWRR - VWRL + ((VWRL + VWRR)/2 - (VWFL + VWFR)/2) \quad (4)$$

where $\Delta VFL$ represents the parameter for brake-adjustment use of the front-left wheel, $\Delta VFR$ represents the parameter for brake-adjustment use of the front-right wheel, $\Delta VRL$ represents the parameter for brake-adjustment use of the rear-left wheel, $\Delta VRR$ represents the parameter for brake-adjustment use of the rear-right wheel, and VWFL, VWFR, VWRL, and VWRR represent the front-left wheel speed, front-right wheel speed, rear-left wheel speed, and rear-right wheel speed, respectively.

Reduction of engine output for example in a case where the above-mentioned engine is an internal combustion engine is achieved by reducing the amount of air intake of the internal combustion engine or by reducing the amount of fuel feed of the internal combustion engine.

Further, wheel behavior is not exclusively restricted to wheel speed, and wheel acceleration or the like may be employed as wheel behavior.

In a method for controlling driving torque of a four-wheel drive vehicle according to the present invention for achieving the above-described second object, a speed differential with another wheel of each of several wheels of a four-wheel drive vehicle is determined as a speed differential for brake-adjustment use, and the driving torque conveyed from the engine to each of the several wheels is adjusted by braking torque on a basis of the above-described speed differential for brake-adjustment use to control the foregoing speed differential. In a case of a running state where acceleration of the four-wheel drive vehicle has not been requested by the driver, control of the speed differential by the foregoing braking torque is prohibited.

This "running state where acceleration has not been requested by the driver" may be for example a "state wherein a deceleration operation has been performed" or a "running state wherein an acceleration operation has not been performed."

When control of the foregoing speed differential is executed in a state wherein a deceleration operation has been performed, there exists a chance that deceleration exceeding the braking operation by the driver may be caused to occur or instability in vehicle behavior may occur due to the above-described reasons. Additionally, in a running state wherein an acceleration operation has not been performed as well, there exists a chance that unforeseen deceleration may be triggered and instability in vehicle behavior may occur due to a similar reason.

Consequently, according to the present invention, when in a running state where acceleration has not been requested by the driver, unforeseen deceleration is prevented and stability of vehicle behavior is maintained by prohibiting control of the speed differential, performed by adjusting driving torque conveyed from the engine to each of the several wheels by braking torque on a basis of the foregoing speed differential for brake-adjustment use.

The deceleration operation is for example braking operation, and may be operation to depress a brake pedal.

Additionally, a state of braking operation may be determined not by directly ascertaining these operations, but by ascertaining that brake-fluid pressure generated by operation of the brake pedal is higher than a predetermined value. For example, brake-fluid pressure may be determined to be higher than a predetermined value by detecting the brake-fluid pressure of a master cylinder.

Deceleration operation as well may be ascertained by a state of occurrence of slippage accompanying deceleration in wheel rotational speed of one or more wheels among the wheels of the four-wheel drive vehicle. Such slippage during deceleration is monitored by an antiskid control system and when an antiskid control system is mounted on the four-wheel drive vehicle, determination may be made by receiving wheel-slippage information from this antiskid control system.

Additionally, a "running state where acceleration has not been requested by the driver" may be for example a state wherein the operation executed for the engine is an operation performed to maintain or reduce the engine output. When the engine is an internal combustion engine, the "running state wherein an operation for acceleration has not been performed" may be taken to be a state where the throttle opening degree of a throttle valve is a predetermined opening degree or less. That is to say, the degree of opening of the throttle valve, the operated quantity of an accelerator pedal or the presence or absence of accelerator-pedal operation may be directly ascertained to detect the running state wherein an operation for acceleration has not been performed.

Furthermore, a "running state wherein an acceleration operation has not been performed" may be ascertained not by such determination on a basis of data directly obtained, but as a state wherein the respective rotational accelerations of all wheels of the four-wheel drive vehicle are all zero or less, or as a state wherein the body acceleration of the four-wheel drive vehicle is zero or less.

During startoff of the vehicle, it is conceivable that there may be a case of startoff while the brake pedal is in a depressed state, and processing to control the foregoing speed differential should be executed in such a case, but when the above-described running state is determined merely based on a fact that braking operation or the like has been performed as was described above, a case occurs wherein processing to control the speed differential is not executed.

Consequently, during startoff of the four-wheel drive vehicle, instead of a running state wherein acceleration has not been requested by the driver, a state wherein the body acceleration of the four-wheel drive vehicle is zero or less, operation conducted with respect to the engine is operation to maintain or reduce engine output, and deceleration operation has been performed may be detected. When such a state is being detected, the above-described control of the speed differential by the braking torque may be prohibited.

Determination of a startoff time may be made according to body speed. For example, when body speed is smaller than a predetermined speed it is determined to be the startoff time. Processing to control the foregoing speed differential is prohibited when the body acceleration of the four-wheel drive vehicle is zero or less, operation conducted with respect to the engine is operation to maintain or reduce engine output, and deceleration operation has been performed during the startoff time. When body speed is greater than a predetermined speed control of the speed differential may be performed according to the above-described several determinations.

The foregoing control of the speed differential by braking torque may be executed with priority for the rear wheels over the front wheels. When the rear wheels are given priority in this way, the rotation of the rear wheels is controlled with priority, and so occurrence of a rotational speed differential between the left and right rear wheels and a tendency of vehicle behavior toward oversteering (spinning) can reliably be prevented. As a result, the vehicle's tractive power (in other words, the transmission ratio of driving torque to the respective wheels) can reliably be enhanced while preventing loss in running stability.

The function for executing such control of driving torque of a four-wheel drive vehicle is provided for example as a program run in a computer system. Such a program can be stored for example in a storage medium such as a floppy disk, a magneto-optical disk, or a CD-ROM and employed by loading and running the program into the computer system as required. Alternatively, the program may be stored in ROM or backup RAM as the storage medium and utilized by incorporating this ROM or backup RAM in the computer system.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS (First Embodiment)

Figure 1:
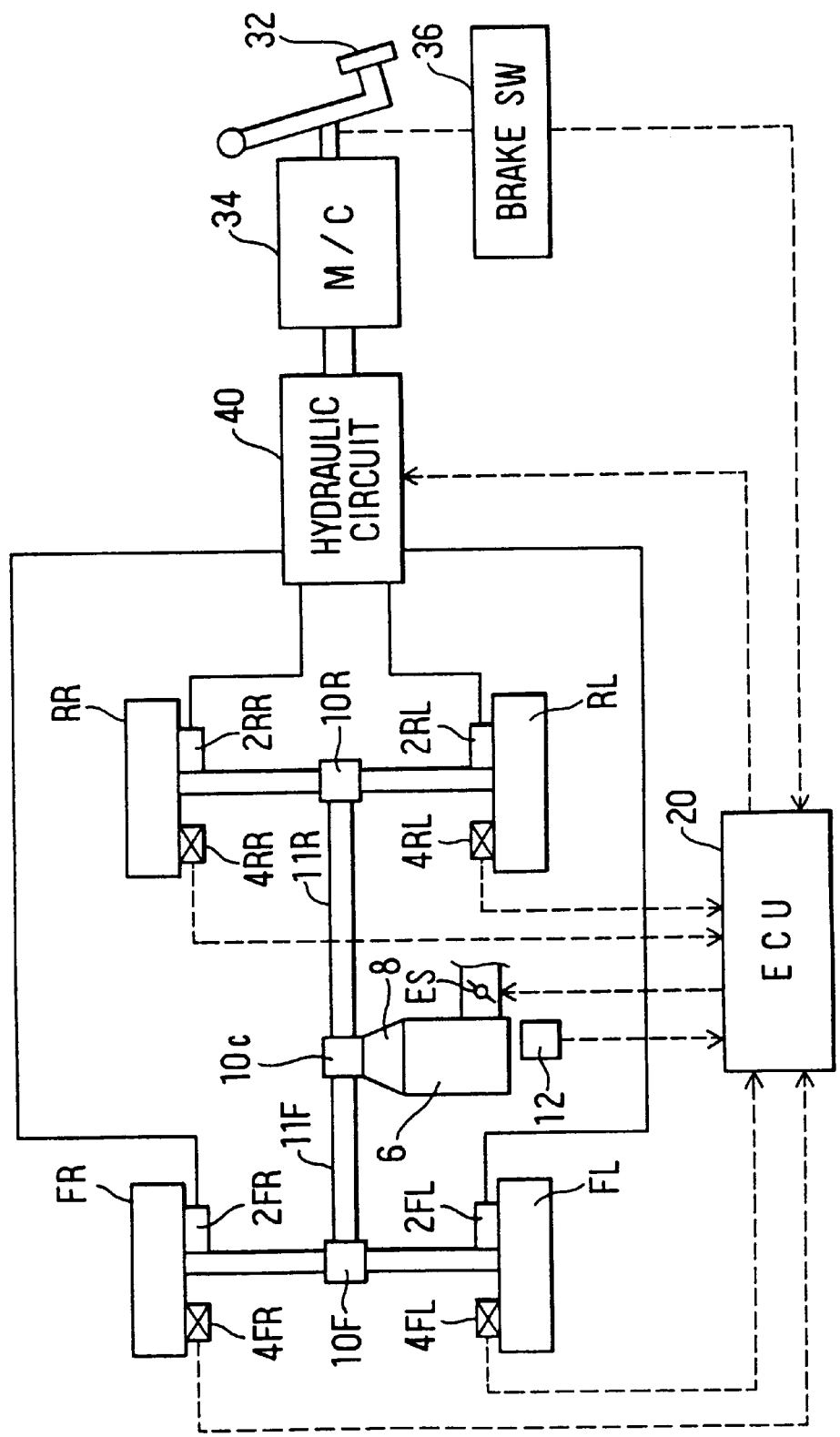
FIG. 1 is a model diagram illustrating a structure of a control system for a four-wheel drive vehicle according to a first embodiment of the present invention.

FIG. 1 is a model diagram illustrating a structure of a control system for a four-wheel drive vehicle according to a first embodiment of the present invention.

In FIG. 1, brake devices of hydraulic-pressure type (hereinafter referred to as "wheel cylinder: W/C") 2FL, 2FR, 2RL, and 2RR to provide braking torque to each of several wheels (front-left wheel FL, front-right wheel FR, rear-left wheel RL, and rear-right wheel RR) are installed to correspond to the four wheels FL, FR, RL, and RR of a vehicle. In addition, wheel-speed sensors 4FL, 4FR, 4RL, and 4RR are also installed to detect rotational speed of each of the four wheels FL, FR, RL, and RR.

Driving torque generated from an engine (here, an internal combustion engine) 6 through a transmission 8 is distributed to a front-wheel driveshaft 11F and a rear-wheel driveshaft 11R through a center differential gear 10C. Further, driving torque distributed to the front-wheel driveshaft 11F is distributed to front-left and front-right wheels FL and FR through a front differential gear 10F and driving torque distributed to the rear-wheel driveshaft 11R is distributed to rear-left and rear-right wheels RL and RR through a rear differential gear 10R.

On the engine 6, a group of sensors 12 to detect an operating state of the engine 6 such as its rotational speed, intake-air quantity, coolant temperature, and throttle-valve opening degree are provided. Detection signals from the group of sensors 12 and from the wheel-speed sensors 4FL through 4RR are fed to an electronic control unit (hereinafter termed "ECU") 20.

The ECU 20 controls an injected-fuel quantity (corresponding to a fuel-feed quantity) and ignition timing of the engine 6 based on the detection signals from the group of sensors 12. In addition, the ECU 20 performs anti-skid control (hereinafter referred to as "ABS control") by which wheel slippage generated during vehicle braking is restrained and differential restraining control (hereinafter referred to as "driving-torque control") by which rotational speed differentials among the respective wheels FL through RR are restrained, by controlling various kinds of actuators within a hydraulic circuit 40 which are disposed in hydraulic conduits reaching from a master cylinder (hereinafter "M/C") 34 which generates brake-fluid pressure in response to depression of a brake pedal 32 to wheel cylinders (W/Cs) 2FL through 2RR of the respective wheels FL through RR.

The ECU 20 is structured mainly from a microprocessor provided with a CPU, a ROM, a RAM, and so on. A detection signal from a brake switch 36 which assumes an "ON" state during operation of the brake pedal 32 is also fed to the ECU 20.

Operation of an accelerator by an operator is detected by a sensor, and an electronic throttle valve ES is provided in an intake system of the engine 6, which is a throttle valve of which opening degree is electronically adjusted in accordance with this detected accelerator operation. When braking torque is excessive as will be described later, this electronic throttle valve ES is adjusted by the ECU 20 to a throttle opening degree which is smaller to the accelerator operation of the operator in order to cause output of the engine 6 to be reduced.

Next, the hydraulic circuit 40 will be described.

Figure 2:
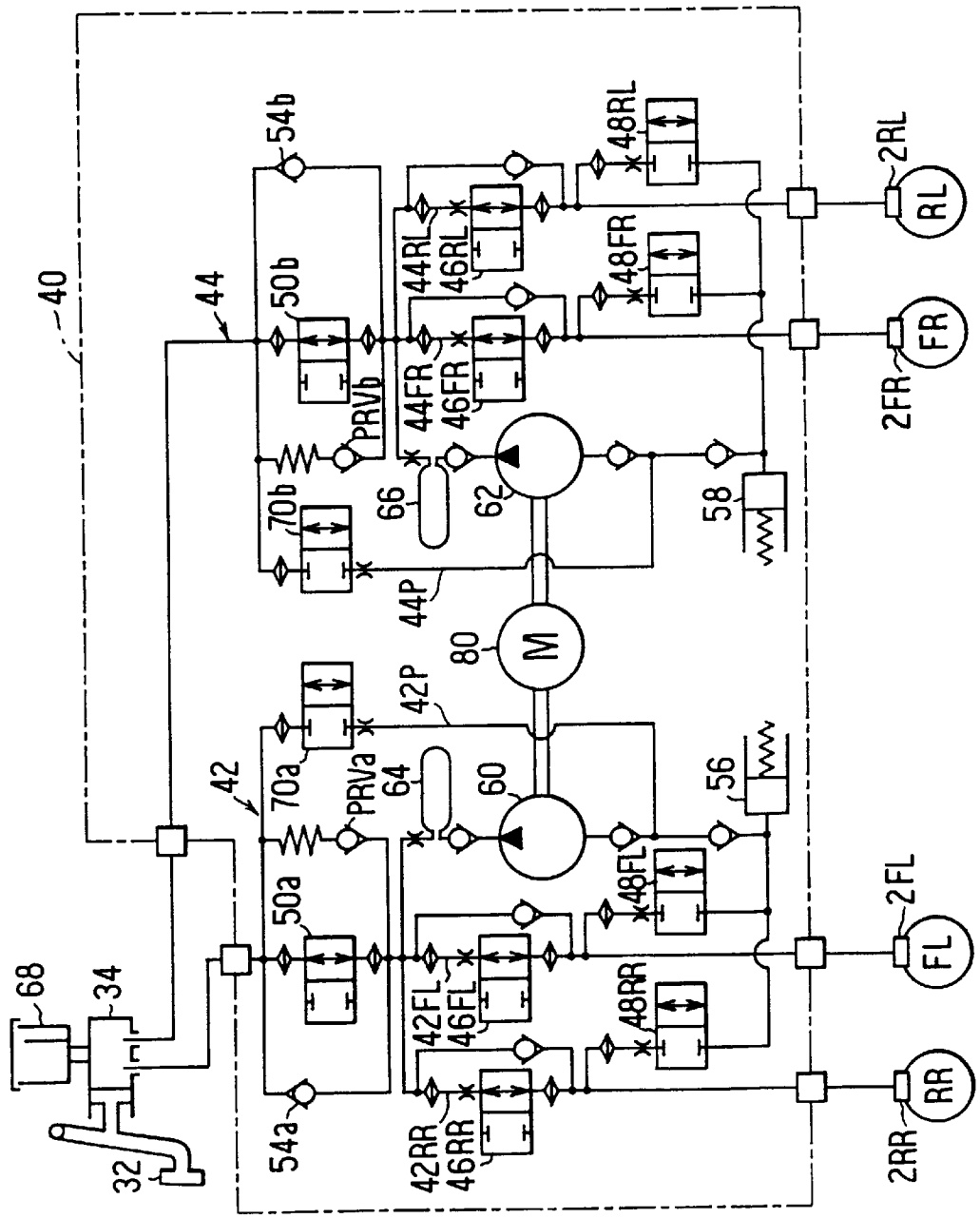
FIG. 2 is a structural view illustrating a hydraulic circuit.

As shown in FIG. 2, the hydraulic circuit 40 includes two hydraulic systems 42 and 44 which supply brake fluid pressurized and discharged from two discharge ports of the M/C 34 to the front-left and rear-right wheels FL and RR and to the front-right and rear-left wheels FR and RL, respectively.

In the hydraulic system 42, pressure-increasing control valves 46FL and 46RR of electromagnetic type are provided in a conduit 42FL reaching to the W/C 2FL of the front-left wheel FL and in a conduit 42RR reaching to the W/C 2RR of the rear-right wheel RR, respectively. The pressure-increasing control valves 46FL and 46RR can be switched between a pressure-increasing position in which the conduits 42FL and 42RR are communicated and a maintaining position in which the conduits 42FL and 42RR are interrupted. Further, in the hydraulic system 42, pressure-reducing control valves 48FL and 48RR of electromagnetic type are provided in the conduit 42FL and the conduit 42RR, respectively. The pressure-reducing control valves 48FL and 48RR control discharge of brake fluid in the W/Cs 2FL and 2RR to a reservoir 56.

In the same way, in the hydraulic system 44, pressure-increasing control valves 46FR and 46RL of electromagnetic type are provided in a conduit 44FR reaching to the W/C 2FR of the front-right wheel FR and in a conduit 44RL reaching to the W/C 2RL of the rear-left wheel RL, respectively. The pressure-increasing control valves 46FR and 46RL can be switched between a pressure-increasing position in which the conduits 44FR and 44RL are communicated and a maintaining position in which the conduits 44FR and 44RL are interrupted. Further, pressure-reducing control valves 48FR and 48RL of electromagnetic type are provided in the conduit 44FR and the conduit 44RL, respectively. The pressure-reducing control valves 48FR and 48RL control discharge of brake fluid in the W/Cs 2FR and 2RL to a reservoir 58.

The pressure-increasing control valves 46FL, 46FR, 46RL, and 46RR normally assume the pressure-increasing position and are switched to the maintaining position in response to current provided from the ECU 20. The pressure-reducing control valves 48FL, 48FR, 48RL, and 48RR normally assume an interrupted state and are switched to a communicated state in response to current provided from the ECU 20, whereby brake fluid in the corresponding W/Cs 2FL through 2RR is discharged to the reservoir 56 or 58.

Additionally, a master-cylinder cut-off valve (hereinafter, "SM valve") 50a is provided on an M/C 34 side of the pressure-increasing control valves 46FL and 46RR in the hydraulic system 42. A relief valve 54a which allows brake fluid to escape from the M/C 34 to the pressure-increasing control valves 46FL and 46RR when brake-fluid pressure on the M/C 34 side is higher than that on the pressure-increasing control valve 46FL and 46RR side is connected in parallel with the SM valve 50a.

Further, an SM valve 50b is provided on the M/C 34 side of the pressure-increasing control valves 46FR and 46RL in the hydraulic system 44. A relief valve 54b which allows brake fluid to escape from the M/C 34 to the pressure-increasing control valves 46FR and 46RL when brake-fluid pressure on the M/C 34 side is higher than that on the pressure-increasing control valve 46FR and 46RL side is connected in parallel with the SM valve 50b.

It should be noted that the SM valves 50a and 50b normally assume a communicated state and are switched to an interrupted state in response to current provided from the ECU 20.

Differential pressure regulating valves PRVa and PRVb are connected in parallel with the SM valves 50a and 50b, respectively. The differential pressure regulating valves PRVa and PRVb prevent brake fluid from flowing from the M/C 34 to the W/C side and allow brake fluid to flow from the W/C side to the M/C 34 when brake-fluid pressure on the W/C side is higher by a predetermined pressure than that on the M/C 34 side. Pressure of 50 atm to 200 atm is acceptable as this predetermined pressure. That is to say, each of the differential pressure regulating valves PRVa and PRVb protects the conduit on the M/C 34 side of the SM valves 50a and 50b by preventing brake-fluid pressure therein from rising beyond a predetermined value.

In FIG. 2, the conduit is provided in parallel to each of the SM valves 50a and 50b, and the differential pressure regulating valves PRVa and PRVb are respectively disposed in the conduits. In substitution for this structure, each of the SM valves 50a and 50b can have a differential pressure regulating valve, which relieves brake fluid at a predetermined relief pressure, at its interrupted position; that is, the above-described differential pressure regulating valves PRVa and PRVb may be built into each of the SM valves 50a and 50b.

Additionally, in the hydraulic systems 42 and 44, reservoirs 56 and 58 which temporarily accumulate brake fluid discharged through the pressure-reducing control valves 48FL through 48RR are provided, and pumps 60 and 62 to send out brake fluid accumulated in the reservoirs 56 and 58 to the conduit between the SM valve 50a and the pressure-increasing control valves 46FL and 46RR and to the conduit between the SM valve 50b and the pressure-increasing control valves 46FR and 46RL are provided. Further, accumulators 64 and 66 to lessen pulsation of hydraulic pressure are disposed in discharge paths of the respective pumps 60 and 62.

Further, in the hydraulic systems 42 and 44 there are provided brake-fluid supplying paths 42P and 44P to directly supply brake fluid from a reservoir 68 mounted on an upper portion of the M/C 34 to the pumps 60 and 62 through the M/C 34 during performance of driving-torque control which will be described later. In these brake-fluid supplying paths 42P and 44P, reservoir cut-off valves (hereinafter "SR valve") 70a and 70b are provided to communicate or interrupt the corresponding brake-fluid supplying paths 42P and 44P.

The SR valves 70a and 70b normally assume the interrupted state and are switched to the communicated state in response to current provided from the ECU 20. Each of the pumps 60 and 62 is driven by a motor 80 during performance of anti-skid control and driving-torque control.

Next, anti-skid control and driving-torque control performed by the ECU 20 will be described.

When anti-skid control and driving-torque control are not performed, all of the electromagnetic valves in the hydraulic circuit are switched off; FIG. 2 illustrates a non-control state in which all of the electromagnetic valves are switched off. In more detail, the SM valves 50a and 50b assume the communicated position, the SR valves 70a and 70b assume the interrupted position, the pressure-increasing control valves 46FL through 46RR assume the communicated position, and the pressure-reducing control valves 48FL through 48RR assume the interrupted position.

[Anti-Skid Control]

Figure 3:
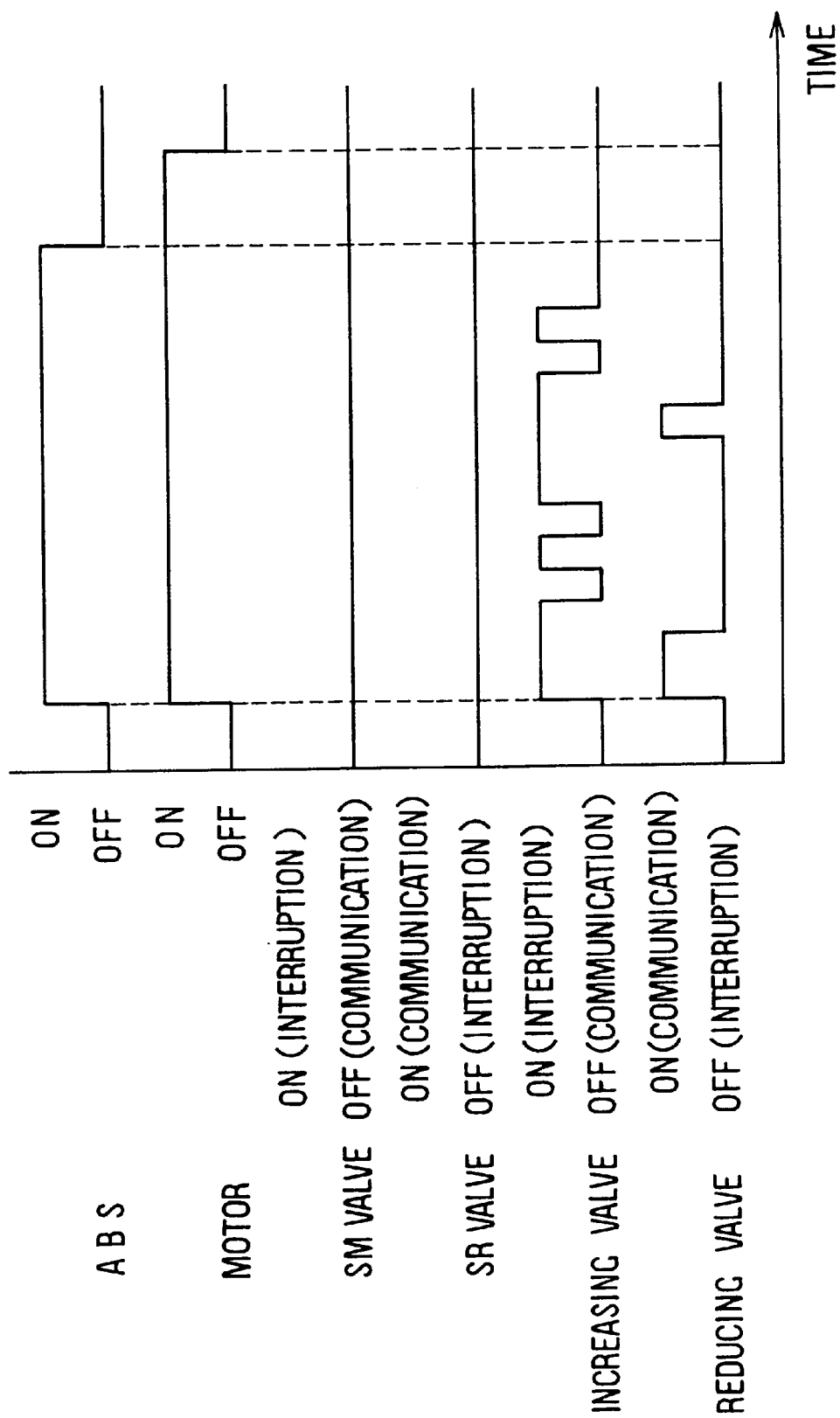
FIG. 3 is a time chart to explain anti-lock brake control performed by an electronic control unit (ECU)

When wheel slippage at each of the wheels FL through RR occurs, for example due to rapid operation of the brake pedal 32 by the driver, as shown in FIG. 3, anti-skid control starts. In anti-skid control, while the SM valves 50a and 50b are maintained in the communicated position ("OFF" state) and the SR valves 70a and 70b are maintained in the interrupted position ("OFF" state), the pumps 60 and 62 are actuated by driving the motor 80, and further, brake-fluid pressure within the respective W/Cs 2FL through 2RR is switched to a pressure-increasing state, a pressure-holding state, or a pressure-reducing state in response to the slipping states of the respective wheels FL through RR by switching on or off the pressure-increasing control valves 46FL through 46RR and the pressure-reducing control valves 48FL and 48RR.

In more detail, when a wheel is determined to have a locking tendency, brake-fluid pressure within the W/C (2FL through 2RR) corresponding to the wheel is reduced to prevent occurrence of wheel locking by switching the pressure-increasing control valve (46FL through 46RR) corresponding to the wheel to the interrupted position ("ON" state) and switching the pressure-reducing control valve (48FL through 48RR) corresponding thereto to the communicated position ("ON" state). At this time, brake fluid discharged from the W/C (2FL through 2RR) as a result of pressure-reducing control flows to a reservoir (56 and 58) via the pressure-reducing control valve (48FL through 48RR). Brake fluid accumulated in the reservoir (56 and 58) is returned to a normal brake-fluid path by driving the motor 80.

Accordingly, when anti-skid control is in progress, if the locking tendency of the wheel is determined to have been eliminated, brake-fluid pressure within the W/C (2FL through 2RR) corresponding to the wheel is increased by switching the pressure-increasing control valve (46FL through 46RR) corresponding to the wheel to the communicated position ("OFF" state) and switching the pressure-reducing control valve (48FL through 48RR) corresponding thereto to the interrupted position ("OFF" state). It should be noted that, because the locking tendency of the wheel is strengthened if W/C brake-fluid pressure is rapidly increased, a state of maintaining W/C brake-fluid pressure is interposed in pressure-increasing control by causing both the pressure-increasing control valve (46FL through 46RR) and the pressure-reducing control valve (48FL through 48RR) to be in the interrupted state (that is, the pressure-increasing control valve="ON" state, and the pressure-reducing control valve="OFF" state). According to this control, W/C brake-fluid pressure is gradually increased, thereby preventing the wheel from locking and assuring the stability of the vehicle.

After anti-skid control is terminated, the motor 80 is driven for a predetermined time to evacuate brake fluid in the reservoir (56 and 58), whereby the following anti-skid control can favorably be performed.

[Driving-Torque Control (Differential Restraining Control)]

Driving-torque control is performed to detect rotational speed differentials among the several wheels FL through RR and to restrain the rotational speed differentials when an operator operates the accelerator to drive the vehicle (that is, the operator does not operate a brake pedal), because if any one of the wheels FL through RR spins in a four-wheel drive vehicle, driving torque is not transmitted to the other wheels by the actions of the respective differential gears 10C, 10F, and 10R as was states in "Related Arts."

In driving-torque control, firstly, the pumps 60 and 62 are actuated by driving the motor 80, and the SM valves 50*a* and 50*b* and the SR valves 70*a* and 70*b* are switched on. That is to say, the SM valves 50*a* and 50*b* are driven to the interrupted position and the SR valves 70*a* and 70*b* are driven to the communicated position. Due to this, a state wherein brake fluid is capable of being sent out from the reservoir 68 mounted on the upper portion of the M/C 34 to the respective pressure-increasing control valves 46FL through 46RR by the pumps 60 and 62 can be obtained.

Further, in driving-torque control, suitable braking torque is applied to each of the wheels FL through RR so that the rotational speed differentials among the wheels FL through RR are restrained by switching on or off the pressure-increasing control valves 46FL through 46RR and the pressure-reducing control valves 48FL through 48RR in response to the rotational speed differentials among the wheels FL through RR.

In more detail, in the same manner as anti-skid control, W/C brake-fluid pressure of each of the wheels FL through RR is switched to a pressure-increasing state, a pressure-holding state, or a pressure-reducing state, whereby braking torque of each of the wheels FL through RR is changed and so driving torque transmitted to each of the wheels FL through RR is regulated.

Driving-torque control processing performed in the ECU 20 to execute driving-torque control will be described hereinafter with reference to a flowchart illustrated in FIG. 5. Note that the driving-torque control processing is periodically performed at every predetermined interval after an ignition switch (not illustrated) is turned on. Further, in the description hereinafter, the numerals or signs accompanying "FL," "FR," "RL," and "RR" represent parts or the like provided for a specific wheel among the several wheels FL through RR. For example a wheel speed VWFL represents a wheel speed of the front-left wheel FL.

Figure 5:
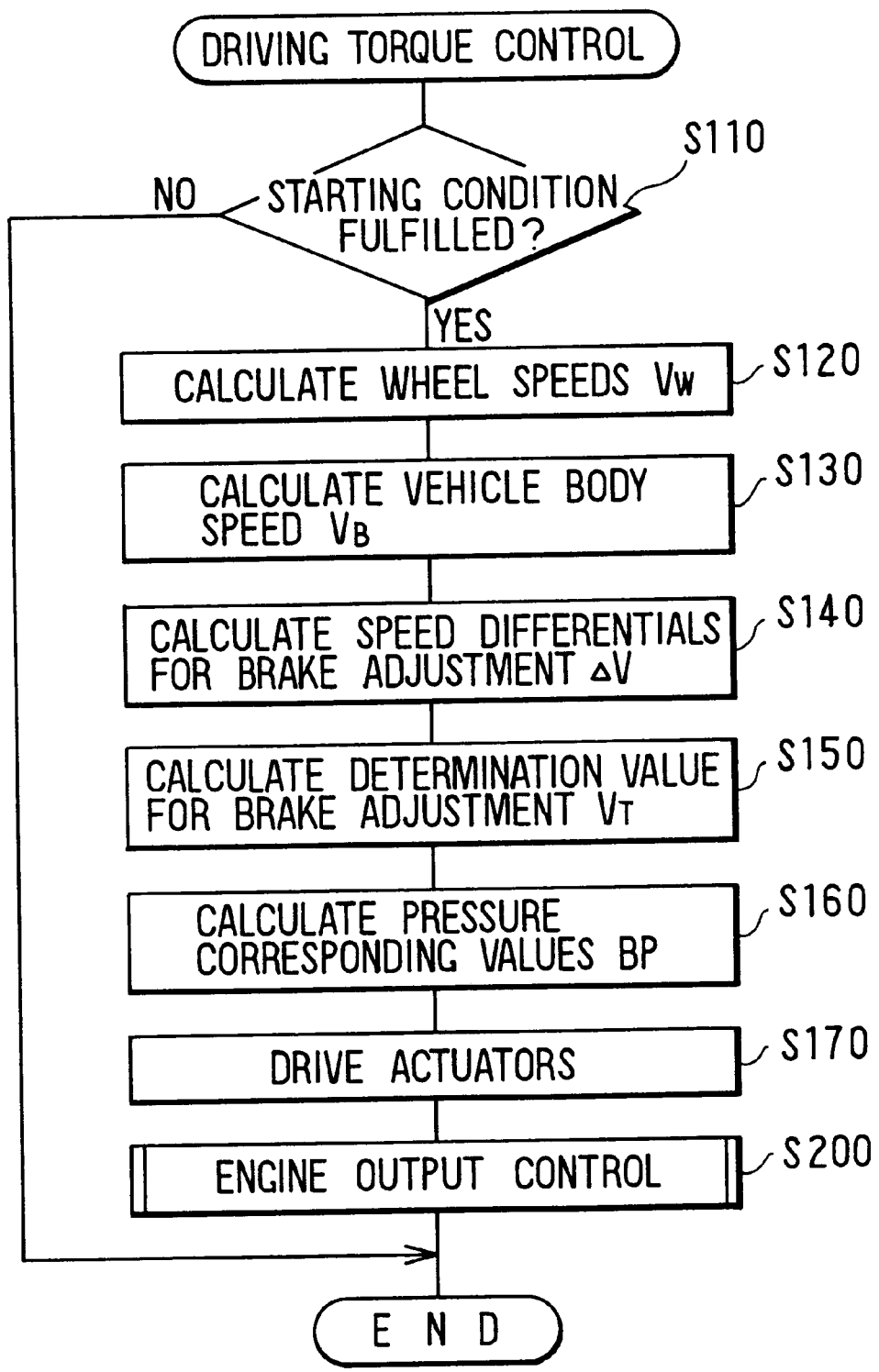
FIG. 5 is a flowchart illustrating steps processed by the ECU to perform driving-torque control.

As shown in FIG. 5, when the driving-torque control processing is started, firstly, in step 110, it is determined whether a starting condition for starting driving-torque control is fulfilled. When the starting condition for starting driving-torque control is not fulfilled, the driving-torque control processing is terminated for the time being; when the starting condition for starting driving-torque control is determined to be fulfilled, the processing advances to step 120. For example, the starting condition is fulfilled when the brake switch 26 is not switched on and an operator depresses the accelerator.

In step 120, respective wheel speeds VWFL through VWRR of the four wheels FL through RR are calculated based on detection signals from the respective wheel-speed sensors 4FL through 4RR. In the following step 130, a vehicle-body speed VB of the vehicle is calculated based on the wheel speeds VWFL through VWRR derived in step 120. This calculation is performed according to a well-known method such that it is determined whether a minimum speed VWmin among the wheels speeds VWFL through VWRR of the respective wheels FL through RR is in a range from an acceleration limit value Vα obtained by adding the previous vehicle-body speed VB(n−1) and a predetermined value to a deceleration limit value Vβ obtained by subtracting a predetermined value from the previous vehicle-body speed VB(n−1); when the minimum speed VWmin is in the range from the acceleration limit value Vα to the deceleration limit value Vβ, the minimum speed VWmin is set as the vehicle-body speed VB as it was; when the minimum speed VWmin exceeds the acceleration limit value Vα, the acceleration limit value Vα is set as the vehicle-body speed VB; and when the minimum speed VWmin lowers below the deceleration limit value Vβ, the deceleration limit value Vβ is set as the vehicle-body speed VB.

After the vehicle-body speed is derived in this way, the processing advances to step 140. In step 140, the respective speed differentials for brake-adjustment use (one example of a parameter for brake-adjustment use) ΔVFL through ΔVRR of the four wheels FL through RR are calculated based on the wheel speeds VWFL through VWRR calculated in step 120 by using the equations (1) through (4).

In more detail, the speed differential for brake-adjustment use ΔVFL of the front-left wheel FL is calculated as shown in the equation (1), by adding a difference (VWFL−VWFR) between the wheel speed VWFL of the front-left wheel FL and the wheel speed VWFR of the front-right wheel FR to a front-rear wheel-speed difference [(VWFL+VWFR)/2−(VWRL+VWRR)/2] which is a difference between an average speed of the wheel speeds VWFL and VWFR of the front-left and -right wheels FL and FR and an average speed of the wheel speeds VWRL and VWRR of the rear-left and -right wheels RL and RR.

The speed differential for brake-adjustment use ΔVFR of the front-right wheel FR is calculated as shown in the equation (2), by adding a difference (VWFR−VWFL) between the wheel speed VWFR of the front-right wheel FR and the wheel speed VWFL of the front-left wheel FL to the above-described front-rear wheel-speed difference [(VWFL+VWFR)/2−(VWRL+VWRR)/2].

Meanwhile, the speed differential for brake-adjustment use ΔVRL of the rear-left wheel RL is calculated as shown in the equation (3), by adding a difference (VWRL−VWRR) between the wheel speed VWRL of the rear-left wheel RL and the wheel speed VWRR of the rear-right wheel RR to a rear-front wheel-speed difference [(VWRL+VWRR)/2−(VWFL+VWFR)/2] which is a difference between an average speed of the wheel speeds VWRL and VWRR of the rear-left and -right wheels RL and RR and an average speed of the wheel speeds VWFL and VWFR of the front-left and -right wheels FL and FR.

The speed differential for brake-adjustment use ΔVRR of the rear-right wheel RR is calculated as shown in the equation (4), by adding a difference (VWRR−VWRL) between the wheel speed VWRR of the rear-right wheel RR and the wheel speed VWRL of the rear-left wheel RL to the rear-front wheel-speed difference [(VWRL+VWRR)/2−(VWFL+VWFR)/2].

That is to say, each of the speed differentials for brake-adjustment use ΔVFL through ΔVRR indicates how high the wheel speed VW of the corresponding wheel is relatively to the wheel speed of the other wheels.

Figure 7:
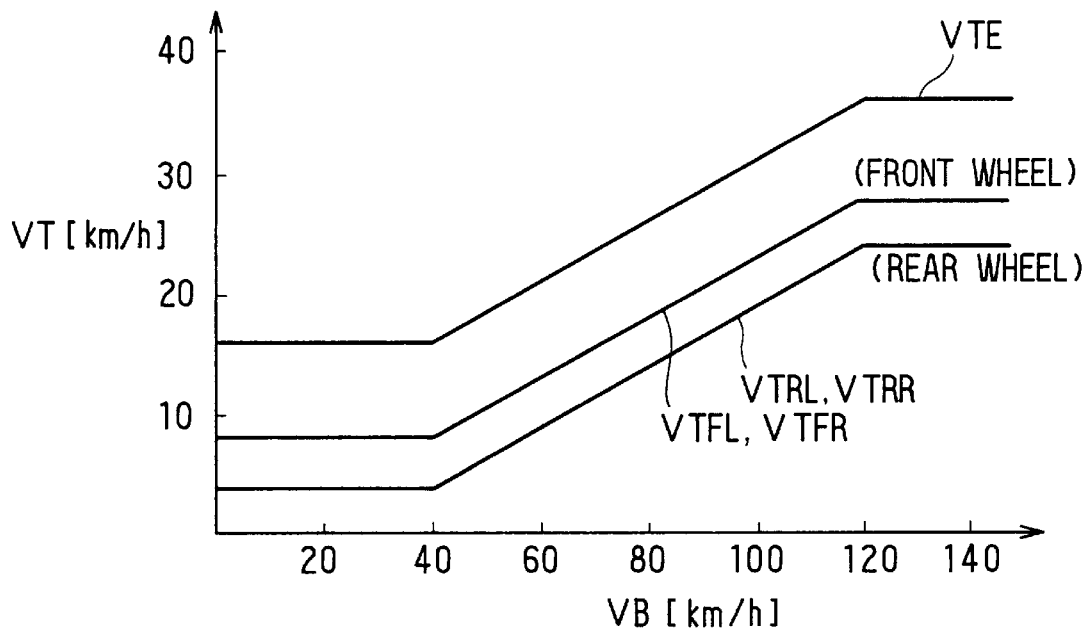
FIG. 7 is a graph illustrating an example of data utilized for driving-torque control.
Figure 8:
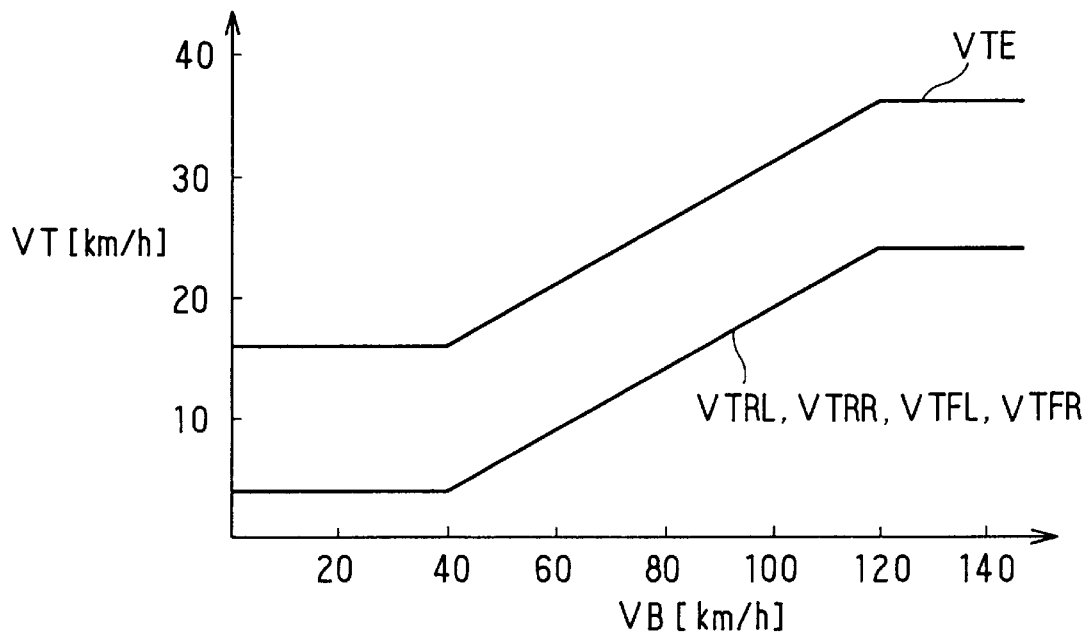
FIG. 8 is a graph illustrating another example of data utilized for driving-torque control.

After the respective speed differentials for brake-adjustment use ΔVFL through ΔVRR of the four wheels FL through RR are thus calculated in step 140, in the subsequent step 150, determination values for brake-adjustment use VTFL through VTRR to be compared with the speed differentials for brake-adjustment use ΔVFL through ΔVRR are established with use of a data map illustrated in FIG. 7 or FIG. 8, on the basis of the vehicle-body speed VB obtained in step 130.

The determination values for brake-adjustment use VTFL through VTRR are used to limit the speed differentials for brake-adjustment use ΔVFL through ΔVRR of the respective wheels FL through RR to the corresponding determination values for brake-adjustment use VTFL through VTRR. In other words, if the speed differentials for brake-adjustment use ΔVFL through ΔVRR of the wheels FL through RR exceed the corresponding determination values for brake-adjustment use VTFL through VTRR, the W/C pressure of the corresponding wheel is increased, as will be described later, and as a result, the speed differentials for brake-adjustment use ΔVFL through ΔVRR of the respective wheels FL through RR are controlled below the corresponding determination values for brake-adjustment use VTFL through VTRR.

As shown in FIG. 7 or FIG. 8, the determination values for brake-adjustment use VTFL through VTRR are established to be the larger values for the higher speed of the vehicle-body speed VB. Specifically, in FIG. 7, the determination values for brake-adjustment use VTRL and VTRR for the rear-left and -right wheels are established to be smaller than the determination values for brake-adjustment use VTFL and VTFR for the front-left and -right wheels. For example, in FIG. 7, the determination values for brake-adjustment use VTRL and VTRR for the rear-left and -right wheels are always established to be smaller by 4 km/h than the determination values for brake-adjustment use VTFL and VTFR for the front-left and -right wheels. As a result, even when the speed differentials for brake-adjustment use ΔVRL and ΔVRR of the rear wheels RL and RR are smaller than those of the front wheels FL and FR, pressure-increase of the W/C pressure (i.e., decrease of driving torque) is performed with respect to the rear wheels RL and RR utilizing the data map of FIG. 7. In FIG. 7, the determination values for brake-adjustment use VTRL and VTRR for the rear-left and -right wheels RL and RR are set to be equal to each other, and the determination values for brake-adjustment use VTFL and VTFR for the front-left and -right wheels FL and FR are set to be equal to each other, too. In FIG. 8, the respective determination values for brake-adjustment use VTFL, VTFR, VTRL, and VTRR of all the wheels FL, FR, RL, and RR are set to be equal to each other.

After the determination values for brake-adjustment use VTFL through VTRR for the respective wheels FL through RR are thus established, the processing advances to step 160, at which brake-fluid pressure corresponding values BPFL through BPRR which correspond to brake-fluid pressures in the respective W/Cs 2FL through 2RR of the wheels FL through RR are calculated using the following equations (5) through (8) making use of the speed differentials for brake-adjustment use ΔVFL through ΔVRR obtained in step 140 and the determination values for brake-adjustment use VTFL through VTRR obtained in step 150. That is to say, the brake-fluid pressure corresponding values BPFL through BPRR are calculated, as shown in the equations (5) through (8), by multiplying a difference (ΔV−VT) of the speed differential for brake-adjustment use ΔV and the determination value for brake-adjustment use VT by a predetermined constant value α with respect to each of the respective wheels FL through RR.

$$BPFL = \alpha \times (\Delta VFL - VTFL) \qquad (5)$$

$$BPFR = \alpha \times (\Delta VFR - VTFR) \qquad (6)$$

$$BPRL = \alpha \times (\Delta VRL - VTRL) \qquad (7)$$

$$BPRR = \alpha \times (\Delta VRR - VTRR) \qquad (8)$$

Figure 4:
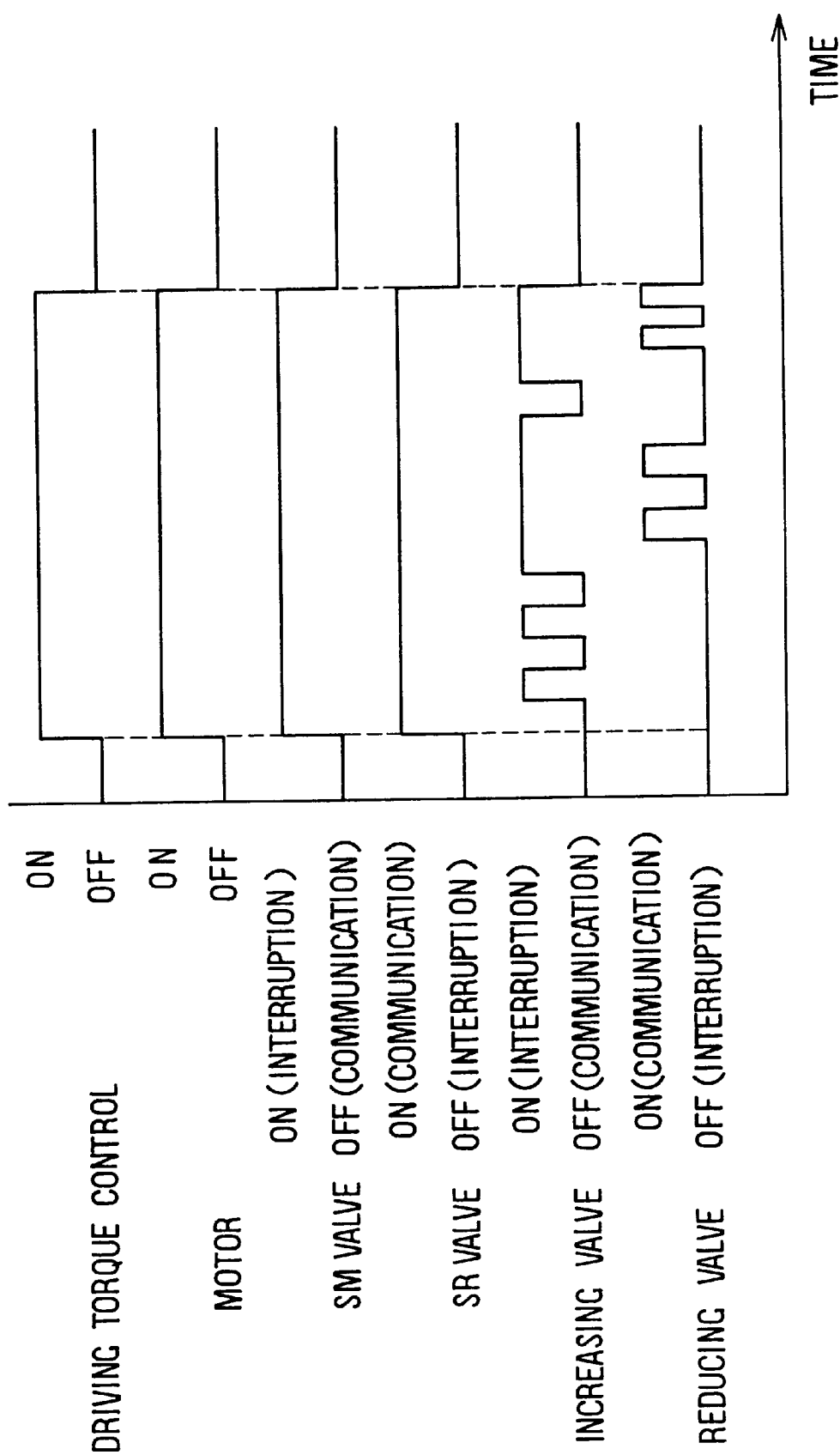
FIG. 4 is a time chart to explain driving-torque control performed by the ECU.

In the subsequent step 170, the pumps 60 and 62 are operated by driving the motor 80, as described with reference to FIG. 4. At the same time, the SM valves 50$a$ and 50$b$ and the SR valves 70$a$ and 70$b$ are turned on so that the SM valves 50$a$ and 50$b$ assume the interrupted positions and the SR valves 70$a$ and 70$b$ assume the communicated positions. Additionally, in step 170, the pressure-increasing control valves 46FL through 46RR and the pressure-reducing control valves 48FL through 48RR are controlled in response to the brake-fluid pressure corresponding values BPFL through BPRR so that the W/C pressures for the respective wheels FL through RR are adequately switched to one of a pressure-increasing state, pressure-reducing state, and pressure-holding state. As a result, driving torque to be transmitted to the respective wheels FL through RR is separately regulated so that the speed differentials for brake-adjustment use ΔVFL through ΔVRR of the respective wheels FL through RR are respectively controlled below the determination values for brake-adjustment use VTFL through VTRR.

Figure 9:
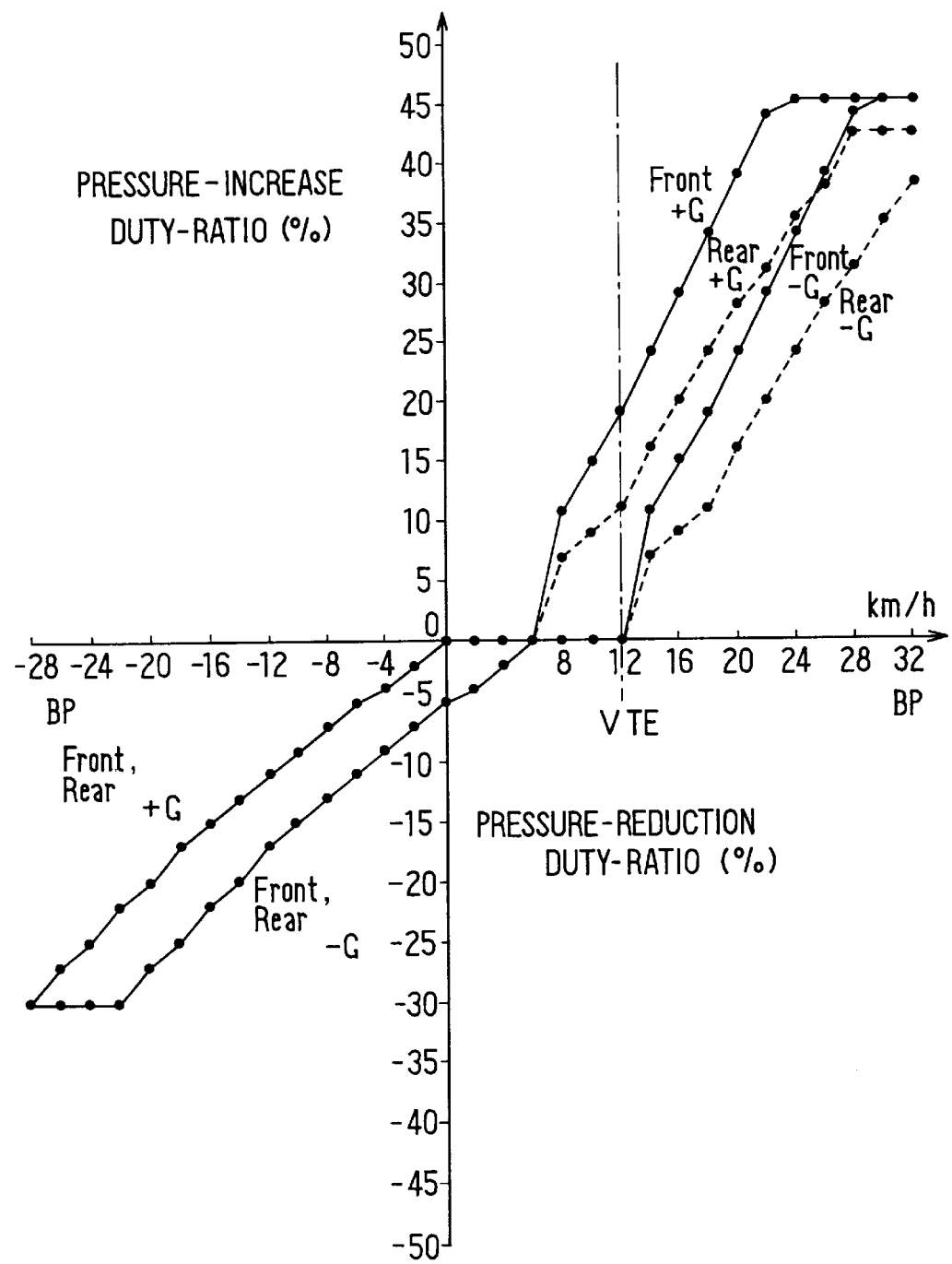
FIG. 9 is a brake duty map illustrating duty ratios with which pressure-increasing and pressure-reducing valves provided for each of front and rear wheels are driven for driving-torque control.

In more detail, based on a brake duty map indicated in FIG. 9, if the speed differential for brake-adjustment use ΔV of any of the wheels rises to the determination value for brake-adjustment use VT or more, and the brake-fluid pressure corresponding value BP calculated in step 160 becomes a positive value, the duty of the on/off signal output from the ECU 20 to the pressure-increasing control valve 46 is controlled so that the W/C pressure of the wheel rapidly becomes larger for a larger positive value of the brake-fluid pressure corresponding value BP (i.e., the more greatly the speed differential for brake-adjustment use ΔV exceeds the determination value for brake-adjustment use VT).

When the brake-fluid pressure corresponding value BP becomes a negative value, the duty of the on/off signal output from the ECU 20 to the pressure-reducing control valve 48 is controlled so that the W/C pressure of the wheel rapidly becomes smaller for a smaller value of the brake-fluid pressure corresponding value BP (i.e., the more greatly the speed differential for brake-adjustment use ΔV falls below the determination value for brake-adjustment use VT). The symbol "Front" represents the front-wheel map and the symbol "Rear" represents the rear-wheel map. The symbol "+G" represents a map in a case where a wheel is accelerating, and "−G" represents a map in a case where a wheel is decelerating. At BP≧6 km/h, the slope for the front wheels is steeper than the slope for the rear wheels in order to meet the hydraulic characteristics of the W/C. At BP=0 to 12 km/h, there exists a portion where duty=0%, but in actuality this portion maintains the W/C pressure of the corresponding wheel.

Figure 6:
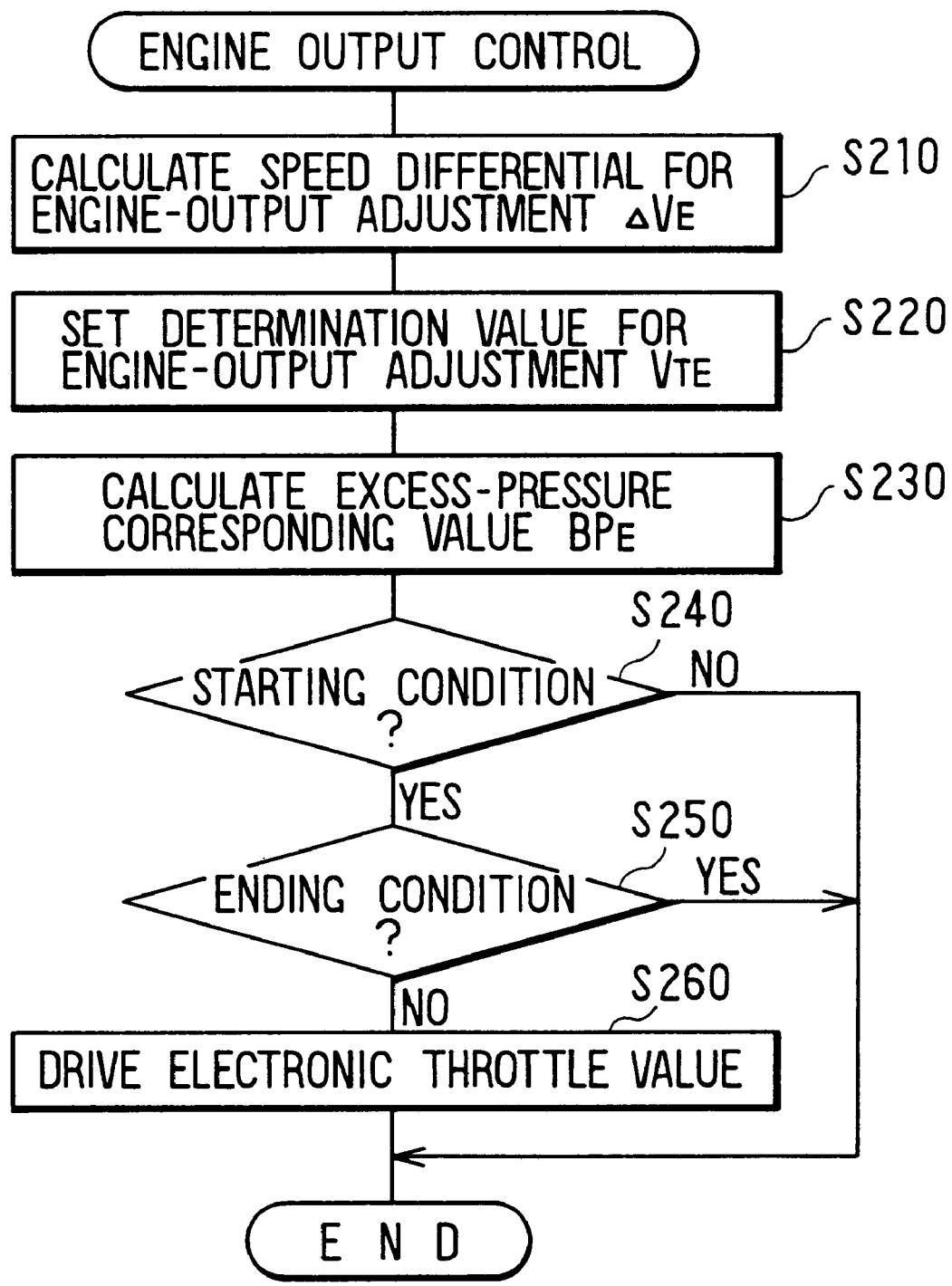
FIG. 6 is a flowchart illustrating steps processed by the ECU to perform engine-output control.

After such processing in step 170 is executed, output-control processing (step 200) of the engine 6 is performed. This output-control processing of the engine 6 is shown in FIG. 6. Firstly, a speed differential for engine-output adjustment use (an example of a parameter for engine-output adjustment use) ΔVE is calculated as shown in the following equation (9) in order to view wheel behavior as an engine-output adjustment condition from the standpoint of wheel speed (step 210).

$$\Delta VE = MAX(VWFL, VWFR, VWRL, VWRR) - MIN(VWFL, VWFR, VWRL, VWRR) \quad (9)$$

Further, wheel acceleration or the like may be employed as wheel behavior.

Herein, MAX ( ) is an operator for obtaining a maximum value, and MIN ( ) is an operator for obtaining a minimum value. Consequently, the difference between the maximum speed and the minimum speed among all the wheels FL through RR is established to be the speed differential for engine-output adjustment use $\Delta VE$. The minimum value has already been determined in step 130, and so the value thereof may be used.

Next, a determination value for engine-output adjustment use VTE is established in accordance with the vehicle-body speed VB utilizing the data map of FIG. 7 or FIG. 8 (step 220). As is understood from FIG. 7 or FIG. 8, the determination value for engine-output adjustment use VTE is always established at a value larger by a predetermined value than the determination values for brake-adjustment use VTFL through VTRR. For example, in FIG. 7, the determination value for engine-output adjustment use VTE is established to be 8 km/h larger than the determination values for brake-adjustment use VTFL and VTFR of the front-left and -right wheels FL and FR (12 km/h larger than the determination values for brake-adjustment use VTRL and VTRR of the rear-left and -right wheels RL and RR). In FIG. 8, the determination value for engine-output adjustment use VTE is established to be 12 km/h larger than the determination values for brake-adjustment use VTFL through VTRR of all wheels FL through RR. Consequently, there is no reduction of engine output with acceleration remaining insufficient, and so acceleration performance is maintained.

Next, a brake-fluid excess-pressure corresponding value BPE is computed using equation 10 (step 230).

$$BPE = \Delta VE - VTE \quad (10)$$

Next, it is determined whether a starting condition for engine-output control is fulfilled (step 240). This starting condition is determined according to whether BPE>0. When the starting condition for engine-output control is not fulfilled ("NO" in step 240), engine-output control processing is terminated. When the starting condition for engine-output control is fulfilled ("YES" in step 240), next, it is determined whether an ending condition for engine-output control is fulfilled (step 250). This ending condition is determined according to whether BPE has become lower than an ending-condition determination value set sufficiently lower than 0, or whether a state wherein BPE$\leq$0 has continued for a predetermined time, or the like. Alternatively, determination can be made according to whether the throttle opening degree controlled by engine output control has become the same as an opening degree instructed through acceleration operation by the operator.

When determined in step 240 to be "YES" and determined in step 250 to be "NO," the electronic throttle valve ES is driven (step 260). That is to say, the electronic throttle valve ES is controlled so that the opening degree thereof become smaller than the throttle opening degree instructed by the operator by an amount corresponding to the brake-fluid excess-pressure corresponding value BPE determined in step 230. For example, the reduction amount $\theta d$ of the throttle opening degree is determined from the brake-fluid excess-pressure corresponding value BPE by a predetermined calculation or a table, and the electronic throttle valve ES is adjusted to assume a control opening degree $\theta E$ reduced by the reduction amount $\theta d$ from the throttle opening degree $\theta 0$ instructed by the operator.

Due to this, output of the engine 6 can be reduced in a case where an excessive wheel-speed differential (an example of a wheel-behavior differential) occurs among the wheels FL through RR and braking torque is about to become excessive. As a result, wear and heating of the brake pad in the brake apparatus, frequency of operation of the actuator for adjusting hydraulic pressure becoming high, and increase in load on the drivetrain are prevented. Therefore, decline in the durability of the brake apparatus and the drivetrain can be prevented. Also, because the determination value for engine-output adjustment use VTE is set to be larger than the determination values for brake-adjustment use VTFL through VTRR so that engine output becomes sufficiently high, acceleration performance is not sacrificed even when reduction of engine output is performed.

When engine-output control (step 200) ends, driving-torque control processing is ended for the time being, and after the elapse of a predetermined time, execution of processing starts again from step 110.

Next, as a specific example, a case where slipping of the front-left wheel FL and the rear-left wheel RL occurs during acceleration on a road straddling differing friction coefficients on the left and right sides and driving-torque control is performed utilizing the data map in FIG. 8 will be described based on the timing chart of FIG. 10.

Firstly, because the front-left wheel FL and the rear-left wheel RL have started to spin, the speeds VWFL and VWRL thereof (represented as VMAX in this example because they become the maximum speeds) suddenly rise and move away from the speeds VWFR and VWRR of the other wheels FR and RR (represented as VMIN in this example because they become the minimum speeds) at time t0. When $\Delta$VFL and $\Delta$VRL determined from the above-described equations (1) and (3) respectively exceed the determination values for brake-adjustment use VTFL and VTRL, the brake-fluid pressure corresponding values BPFL and BPRL established on the basis of equations (5) and (7) exceed 0 at time t1.

Consequently, at the time t1 or after, based on the brake-duty map shown in FIG. 9 brake-fluid pressure generated by driving the pumps 60 and 62 is applied to the W/Cs 2FL and 2RL. As a result, the brake-fluid pressure rises, and driving torque control of the front-left wheel FL and the rear-left wheel RL by the braking torque starts.

When time t2 is reached, the value of VWMAX−VWMIN, that is to say, $\Delta$VE, exceeds the determination value for engine-output adjustment use VTE. Therefore, the brake-fluid excess-pressure corresponding value BPE becomes greater than 0, and control to reduce the output of the engine 6 is started by the opening degree of the electronic throttle valve ES becoming smaller in correspondence with the value of BPE.

Because the output of the engine 6 is reduced in this way, the driving torque of the wheel is progressively reduced. Consequently, rise in the speeds VWFL and VWRL of the front-left wheel FL and the rear-left wheel RL for which brake-fluid pressure is particularly high is suppressed and further lowered, as indicated by the solid lines in FIG. 10. Due to this, rise in the brake-fluid pressure corresponding values BPFL and BPRL is suppressed and lowered, and so rise in brake-fluid pressure is suppressed as shown by the solid line in FIG. 10.

Figure 10:
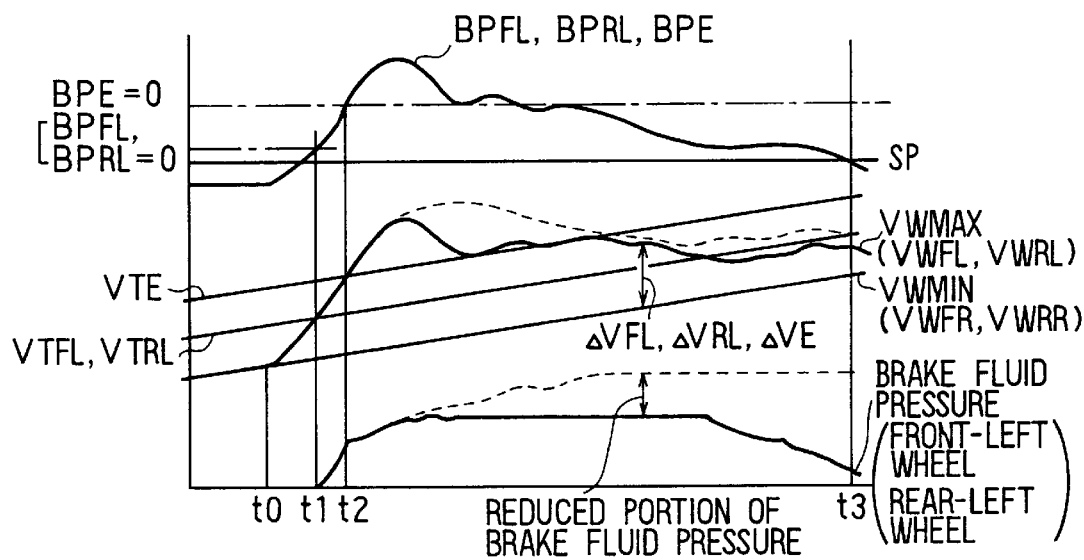
FIG. 10 is a time chart to explain an example of operation according to a mode of embodiment.

If output reduction of the engine 6 were not performed, the brake-fluid pressure corresponding values BPFL and BPRL and the brake-fluid pressure would change as shown by the broken lines in FIG. 10, and brake-fluid pressure becomes still higher. In addition, because operation of the actuator for applying brake-fluid pressure would come to be of long duration, wear to the brake pad and frequency of operation of the actuator would increase, durability of the brake apparatus would decline, load on the drivetrain would become larger, and durability of the drivetrain would also decline. According to the present embodiment, however, problems such as these does not occur. Such a result is similar also to a case utilizing the data map of FIG. 7.

When the data map of FIG. 7 is utilized, the determination values for brake-adjustment use VTRL and VTRR for the rear-left and -right wheels RL and RR are set to be smaller than the determination values for brake-adjustment use VTFL and VTFR for the front-left and -right wheels FL and FR. As a result, when the speed differential for brake-adjustment use $\Delta V$ of the rear wheel is smaller than that of the front wheel, pressure-increase of the W/C pressure is executed with respect to the rear wheel. Therefore, when a wheel-speed differential is generated both between the front-left wheel and the front-right wheel and between the rear-left wheel and the rear-right wheel, eliminating the wheel-speed differential between the rear-left wheel and the rear-right wheel in preference to the wheel-speed differential between the front-left wheel and the front-right wheel is attempted. As a result, priority is given to preventing the motion of the vehicle from falling into a tendency to over-steer as a result of the wheel-speed differential occurring between the rear-left and -right wheels RL and RR. Therefore, tractive force to move the vehicle can be enhanced while preventing running stability of the vehicle from deteriorating.

Also, in the present embodiment, the wheel-speed differentials $\Delta$VFL and $\Delta$VFR are calculated by adding each of the wheel-speed differentials [VWFL−VWFR] and [VWFR−VWFL] between the front-left wheel and the front-right wheel to the front-rear wheel-speed differential [(VWFL+VWFR)/2−(VWRL+VWRR)/2], and the wheel-speed differentials for brake-adjustment use $\Delta$VRL and $\Delta$VRR are calculated by adding each of the wheel-speed differentials [VWRL−VWRR] and [VWRR−VWRL] between the rear-left wheel and the rear-right wheel to the rear-front wheel-speed differential [(VWRL+VWRR)/2−(VWFL+VWFR)/2]. Therefore, as a total wheel speed [VWFL+VWFR] of the front-left and -right wheels FL and FR becomes higher than a total wheel speed [VWRL+VWRR] of the rear-left and -right wheels RL and RR, the respective speed differentials for brake-adjustment use $\Delta$VFL and $\Delta$VFR of the front-left and -right wheels FL and FR become larger. When both of the speed differentials for brake-adjustment use $\Delta$VFL and $\Delta$VFR exceed the corresponding determination values for brake-adjustment use VTFL and VTFR (note that VTFL and VTFR are equal in this embodiment), braking torque is applied to both the front-left wheel FL and the front-right wheel FR. As a result, the wheel-speed differential between the front wheels and the rear wheels is suppressed.

Conversely, as a total wheel speed [VWRL+VWRR] of the rear-left and -right wheels RL and RR becomes higher than a total wheel speed [VWFL+VWFR] of the front-left and -right wheels FL and FR, the respective speed differentials for brake-adjustment use $\Delta$VRL and $\Delta$VRR of the rear-left and -right wheels RL and RR become larger. When both of the speed differentials for brake-adjustment use $\Delta$VRL and $\Delta$VRR exceed the corresponding determination values for brake-adjustment use VTRL and VTRR (note that VTRL and VTRR are equal in this embodiment), braking torque is applied to both the rear-left wheel RL and the rear-right wheel RR. As a result, the wheel-speed differential between the front wheels and the rear wheels is suppressed. Therefore, according to the present embodiment, because the wheel-speed differential between the front wheels and the rear wheels can be suppressed as well, the tractive force to move the vehicle can be further reliably enhanced while preventing the running stability of the vehicle from deteriorating.

It should be noted that, in the present embodiment, because the speed differentials for brake-adjustment use $\Delta$VFL through $\Delta$VRR of the respective wheels FL through RR are calculated based on the detection signals from the wheel-speed sensors 4FL through 4RR, driving torque to be transmitted to the respective wheels FL through RR can be accurately controlled with a simple structure. However, by monitoring differential states of the front differential gear 10F and the rear differential gear 10R, the wheel-speed differentials [VWFL−VWFR] and [VWFR−VWFL] between the front-left wheel FL and the front-right wheel FR and the wheel-speed differentials [VWRL−VWRR] and [VWRR−VWRL] between the rear-left wheel RL and the rear-right wheel RR may be detected. Further, by monitoring a differential state of the center differential gear 10C, the front-rear wheel-speed differential [(VWFL+VWFR)/2−(VWRL+VWRR)/2] and the rear-front wheel-speed differential [(VWRL+VWRR)/2−(VWFL+VWFR)/2] may be detected. The speed differentials for brake-adjustment use $\Delta$VFL through $\Delta$VRR and the speed differential for engine-output adjustment use $\Delta$VE can be obtained based on these detected results.

In the present embodiment, because the driving torque to be transmitted to the respective wheels FL through RR is regulated by applying braking torque to the respective wheels FL through RR and reducing the opening degree of the electronic throttle valve ES of the engine 6, the above-described effects can be obtained by utilizing an existing brake system and engine-control system mounted on the vehicle. Therefore, the addition of another apparatus to the vehicle can be avoided.

In more detail, in the hydraulic circuit 40 illustrated in FIG. 2, a hydraulic circuit except for the SM valves 50a and 50b, the relief valves 54a and 54b, and the SR valves 70a and 70b is normally required to perform anti-skid control as a brake system. That is, the present embodiment may be structured merely by adding the SM valves 50a and 50b, the relief valves 54a and 54b, and the SR valves 70a and 70b to the above-described hydraulic circuit. Additionally, the engine-control system may be structured merely by adding a control program of step 200.

Figure 11:
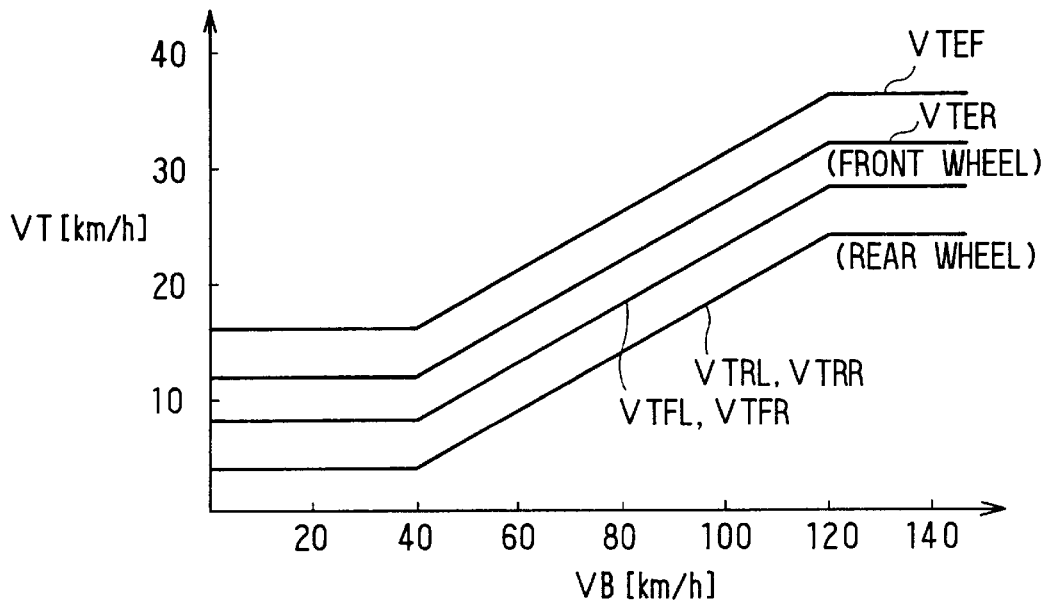
FIG. 11 is a graph illustrating another example of data utilized for driving-torque control.

In the above-described embodiment, even in a case where the data map of FIG. 7 was employed to establish a determination value for brake-adjustment use, there is solely one determination value for engine-output adjustment use VTE, as shown in FIG. 7; however, the determination value for engine-output adjustment use VTE may be changed according to whether the maximum-speed wheel is a front wheel or a rear wheel. For example, as shown in FIG. 11, there may be established a determination value for engine-output adjustment use VTEF at a position shifted upwardly by a predetermined value from the determination values for brake-adjustment use VTFL and VTFR for the front wheels when the front wheels are at maximum speed, and a determination value for engine-output adjustment use VTER at a position shifted upwardly by a predetermined value from the determination values for brake-adjustment use VTRL and VTRR for the rear wheels when the rear wheels are at maximum speed. When such a determination value is employed, output control of the engine can be caused to be compatible with a wheel at which excessive braking torque is generated, and so control of higher accuracy becomes possible.

(Second Embodiment)

A second embodiment of the present invention will be described next.

Figure 12:
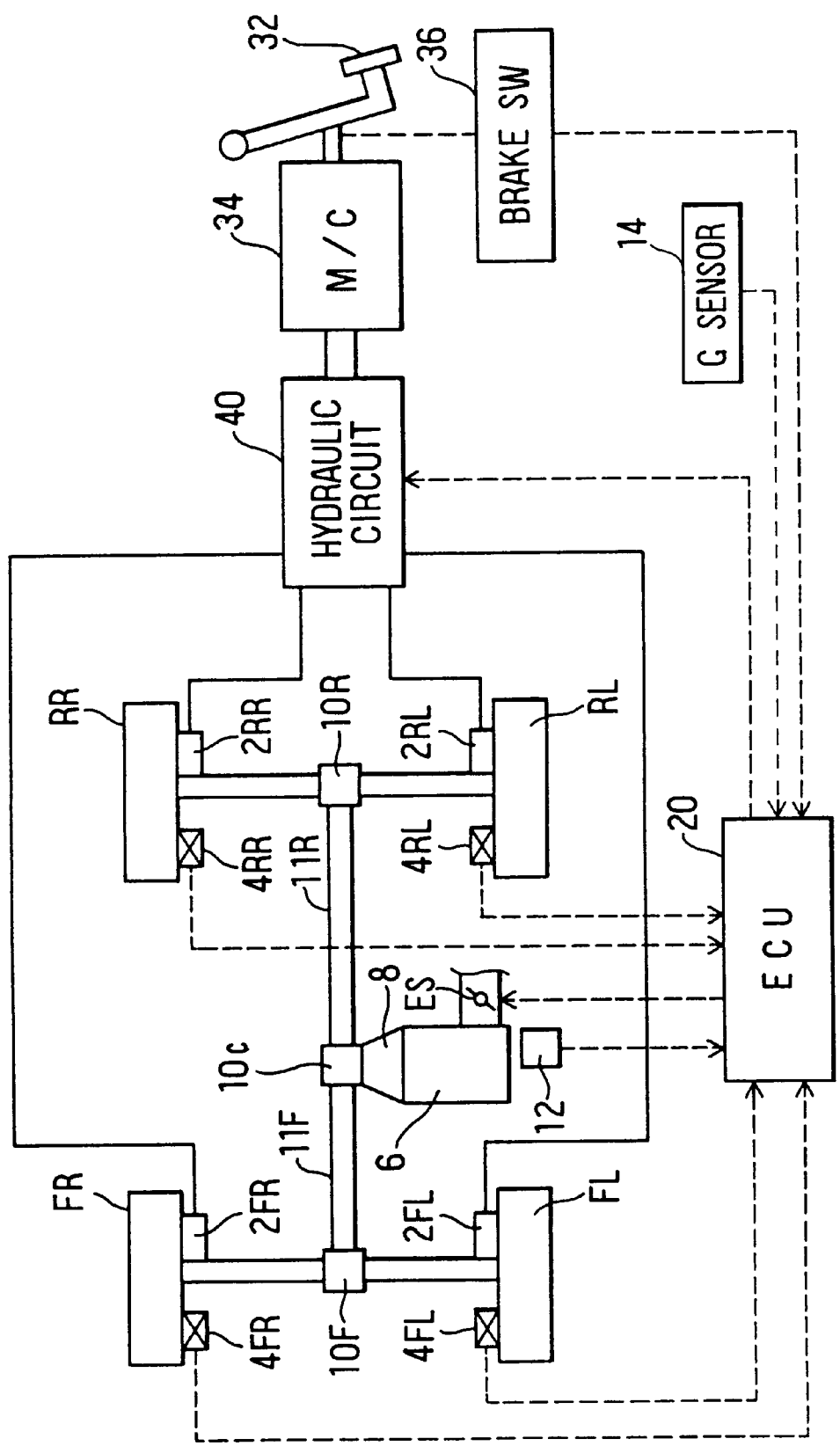
FIG. 12 is a schematic block diagram illustrating a control system for a four-wheel drive vehicle according to a second embodiment of the present invention.

FIG. 12 is a model diagram illustrating a structure of a control system for a four-wheel drive vehicle according to the second embodiment of the present invention.

As shown in FIG. 12, the structure of the second embodiment is substantially identical to that of the first embodiment. However, the second embodiment, is provided with a vehicle-body acceleration sensor 14 on a vehicle body (not illustrated) in addition to the structure of the first embodiment. A signal from this vehicle-body acceleration sensor 14 as well is input to the ECU 20.

Anti-skid control is performed in this second embodiment as well, but because this anti-skid control is similar to that of the first embodiment, description thereof will be omitted.

Driving-torque control which differs from the first embodiment will be described hereinafter chiefly with respect to the points of difference thereof.

Driving-torque control is performed to detect rotational speed differentials among the several wheels FL through RR and to restrain the rotational speed differentials, because if any one of the wheels FL through RR spins in a four-wheel drive vehicle, driving torque is not transmitted to the other wheels by the actions of the respective differential gears 10C, 10F, and 10R, as described earlier.

In the present driving-torque control, it is determined whether a driving state exists wherein the operator has not requested acceleration, and in a case of no acceleration request, adjustment of driving torque is prohibited.

Driving-torque control processing performed in the ECU 20 to execute driving-torque control will be described hereinafter with reference to a flowchart illustrated in FIG. 13. Note that the driving-torque control processing is periodically performed at every predetermined interval after an ignition switch (not illustrated) is turned on. Further, in the description hereinafter, the numerals or signs accompanying "FL," "FR," "RL," and "RR" represent parts or the like provided for a specific wheel among the several wheels FL, FR, RL, and RR. For example a wheel speed VWFL represents a wheel speed of the front-left wheel FL.

Figure 13:
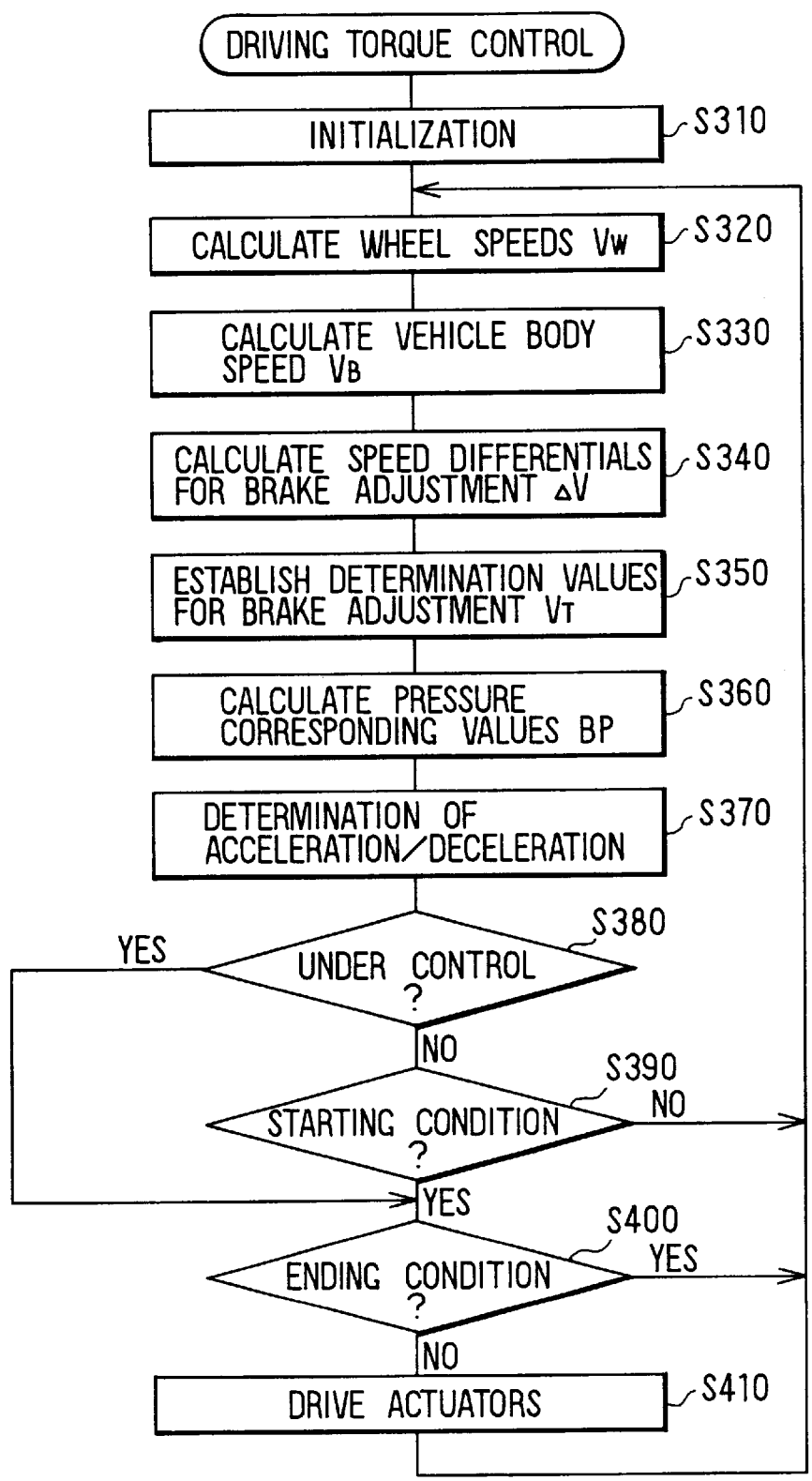
FIG. 13 is a flowchart illustrating steps processed by the ECU to perform driving-torque control.

As shown in FIG. 13, when the driving-torque control processing is started, firstly, in step 310, initialization processing is performed. Next, in step 320, respective wheel speeds VWFL through VWRR of the four wheels FL through RR are calculated based on detection signals from the respective wheel-speed sensors 4FL through 4RR. In the following step 330, a vehicle-body speed VB of the vehicle is calculated based on the wheel speeds VWFL through VWRR derived in step 320. This calculation is performed similarly to that of the first embodiment.

After the vehicle-body speed is derived in this way, the processing advances to step 340. In step 340, the respective speed differentials for brake-adjustment use (one example of a parameter for brake-adjustment use) ΔVFL through ΔVRR of the four wheels FL through RR are calculated based on the wheel speeds VWFL through VWRR calculated in step 320 by using the above-described equations (1) through (4).

That is to say, each of the speed differentials for brake-adjustment use ΔVFL through ΔVRR indicates how high the wheel speed VW of the corresponding wheel is relatively to the wheel speed of the other wheels.

After the respective speed differentials for brake-adjustment use ΔVFL through ΔVRR of the four wheels FL through RR are thus calculated in step 340, in the subsequent step 350, determination values for brake-adjustment use VTFL through VTRR to be compared with the speed differentials for brake-adjustment use ΔVFL through ΔVRR are established with use of a data map illustrated in FIG. 7 or FIG. 8, on the basis of the vehicle-body speed VB obtained in step 330.

After the determination values for brake-adjustment use VTFL through VTRR for the respective wheels FL through RR are thus established, the processing advances to step 360, at which brake-fluid pressure corresponding values BPFL through BPRR which correspond to brake-fluid pressures in the respective W/Cs 2FL through 2RR of the wheels FL through RR are calculated using the above-described equations (5) through (8) making use of the speed differentials for brake-adjustment use ΔVFL through ΔVRR obtained in step 340 and the determination values for brake-adjustment use VTFL through VTRR obtained in step 350.

Next, acceleration/deceleration determination processing is performed in step 170. Determination for this processing is made according to the conditions indicated below.

(1) In a case of vehicle-body speed VB≧5 km/h (i.e., a case of travel other than during startoff), when all wheel accelerations DVW of the four wheels are DVW≦0 (G), a determination of deceleration is established; when even one wheel acceleration DVW of the four wheels is DVW>0 (G), a determination of deceleration is not established, and the prior determination is maintained. That is to say, when the previous determination was of acceleration, the determination of acceleration is maintained, and when the previous determination was of deceleration, the determination of deceleration is maintained.

(2) In a case of vehicle-body speed VB<5 km/h (i.e., a case of startoff), when the following conditions (a), (b), and (c) have all been fulfilled, a determination of deceleration is established.

(a) Vehicle-body acceleration DVTO detected by the G sensor 14 is DVTO≦0 (G).

(b) Throttle opening degree θ is θ≦KTHEND. KTHEND is a determination value corresponding to a throttle opening degree at which acceleration does not occur. A condition wherein an idle switch which is switched on when the electronic throttle valve ES has assumed a fully-closed state has been switched on may be utilized in substitution of θ≦KTHEND.

(c) The brake switch 36 is on. The brake switch 36 is a switch which is switched on when the brake pedal 2 is depressed.

When any one of these conditions (a), (b), and (c) has not been fulfilled, a determination of deceleration is not established, and the prior determination is maintained. That is to say, when the previous determination was of acceleration, the determination of acceleration is maintained, and when the previous determination was of deceleration, the determination of deceleration is maintained.

(3) In a case where a state of nonestablishment of determination of deceleration has continued for a predetermined time (for example, 48 ms), determination of acceleration is established.

Next, in step 380, it is determined whether braking-torque control for differential restraining has actually been performed.

When control is in progress ("YES" in step 380), processing jumps directly to step 400 which will be described later. When control is not in progress ("NO" in step 380), it is determined in the subsequent step 390 whether a starting condition for braking-torque control has been fulfilled. This starting condition is determined to be fulfilled in a case where, the following two conditions are simultaneously satisfied: (a) BP derived in step 360 is BP>0, and (b) determination of acceleration is in effect (i.e., determination of acceleration was made in step 370 or determination of acceleration is being maintained).

When these two conditions (a) and (b) are not both fulfilled ("NO" in step 390), no driving of an actuator is performed in step 410, that is, braking-torque control is not performed, processing returns to step 320, and the above-described processing is repeated.

Meanwhile, when these two conditions (a) and (b) are fulfilled ("YES" in step 390), it is determined in the subsequent step 400 whether an ending condition has been fulfilled. This ending condition is determined to have been fulfilled when either one or the other of the following conditions is satisfied: (a) BP is lower than an ending-condition determination value set sufficiently lower than 0, or a state of $BPE \leq 0$ continues for a predetermined time, or the like (alternatively, the controlled throttle opening degree becomes the same as the opening degree instructed by operation of the accelerator by the operator), and (b) determination of deceleration is in progress (i.e., the determination of deceleration in step 170 has been made or the determination of deceleration is continued).

In a case where either one or the other of conditions (a) and (b) is fulfilled, ("YES" in step 400), no driving of an actuator is performed in step 410, that is, braking-torque control is not performed, processing returns to step 320, and the above-described processing is repeated. Meanwhile, in a case where neither of conditions (a) and (b) is fulfilled, ("NO" in step 400), actuator-driving processing similar to that of the first embodiment is performed in step 410.

After performing the processing in step 410, processing returns to step 320 and the above-described processing is repeated in a predetermined cycle.

With the second embodiment, as was described above, when deceleration is determined to be in progress in the starting-condition determination for braking-torque control in step 390, the starting condition is not satisfied even if other conditions for starting are fulfilled ("NO" in step 390). Therefore, step 410 is not performed, i.e., braking-torque control for differential restraining is not performed. Further, when determination of deceleration is made in the ending-condition determination for braking-torque control in step 400, the ending condition is satisfied even if another condition for ending is not fulfilled ("YES" in step 400). Therefore, the processing of step 410 performed heretofore is not performed and braking-torque control for differential restraining is stopped.

In this way, when a condition of deceleration being determined to be in progress is fulfilled, braking-torque control for differential restraining is not started, or braking-torque control for differential restraining performed theretofore is stopped. That is to say, when deceleration is determined to be in progress, braking-torque control for differential restraining is prohibited.

Figure 14:
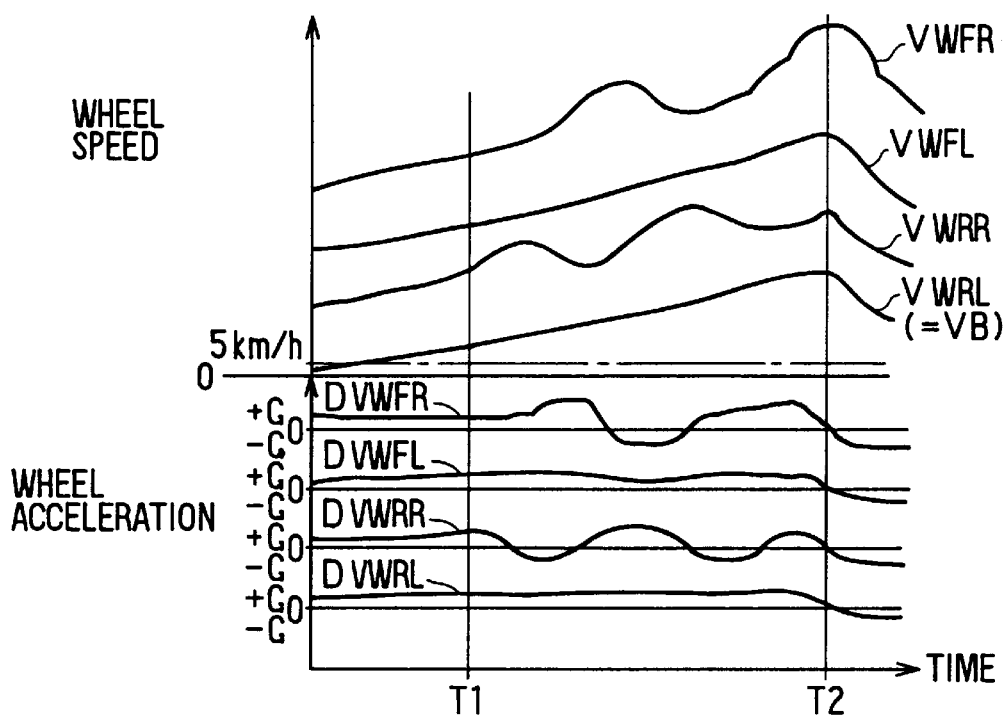
FIG. 14 is a time chart to explain an example of operation of the second embodiment.

As a specific example, as shown in the timing chart of FIG. 14, at a time when all wheels are accelerating (DVW>0), if the friction coefficient $\mu$ of the road changes at time T1, a speed differential occurs among the wheels of the four-wheel drive vehicle, and the brake-fluid pressure corresponding value BP is BP>0 ("YES in step 390 and "NO" in step 400), thereafter, according to driving torque control, braking torque is applied so as to restrain the speed differential and keep the speed differential among the wheels from becoming larger.

During this interval, the vehicle-body speed VB is $VB \geq 5$ km/h, but because wheel acceleration not more than zero ($DVW \leq 0$ (G)) in all four wheels does not occur, braking-torque control for differential restraining is not prohibited.

However, when the operator attempts to stabilize speed by relaxing the depression of the accelerator pedal because further acceleration is no longer desired, or by depressing the brake pedal 32, the wheel accelerations DVWFL, DVWFR, DVWRL, and DVWRR of all wheels decline substantially simultaneously. At time T2 the wheel accelerations DVWFL, DVWFR, DVWRL, and DVWRR of all wheels become $\leq 0$ (G). At this time, the determination of deceleration in step 370 is made, and so the ending condition in step 400 is satisfied, and the processing in step 410 is no longer performed. That is to say, braking-torque control for differential restraining is stopped.

For this reason, when the running state is such that the operator has not requested acceleration, processing to restrain a sped differential among the wheels by adjusting the driving torque conveyed from the engine 6 respectively to the several wheels by a braking torque according to the brake-fluid pressure corresponding value BP can be prohibited, unforeseen deceleration is prevented, and stability of vehicle behavior can be maintained.

(Other Embodiments)

In the above-described embodiments, determination of deceleration is fulfilled (1) in a case of vehicle-body speed $VB \geq 5$ km/h, when the wheel acceleration DVW of all of the four wheel is $DVW \leq 0$ (G), and (2) in a case of vehicle-body speed VB<5 km/h, when all of the following conditions are satisfied: (a) vehicle-body acceleration $DVTO \leq 0$ (G), (b) throttle opening degree $\theta \leq KTHEND$, and (c) the brake switch 36 is on.

However, in the case of vehicle-body speed $VB \geq 5$ km/h, a running state wherein the operator has not requested acceleration can be determined by any one of the following conditions (a) through (e) in substitution for the above-described conditions, and so determination of deceleration may be construed to be fulfilled when any of these conditions is satisfied. Further, a combination of any of these conditions (a) through (e) and the above-described conditions (1) and (2) may be utilized in determination of deceleration.

Namely, these conditions are (a) a case where the brake switch 36 is on and depression of the brake pedal 32 is detected; (b) a case where depression of the brake pedal 32 is detected by brake-fluid pressure generated in the M/C 34 becoming higher than a predetermined value due to operation of the brake pedal 32; (c) a case where slippage of one or more wheels of the four-wheel drive vehicle accompanying deceleration in rotational speed is detected (for example, this can be detected according to information from the above-described anti-skid control system); (d) a case where vehicle-body acceleration of the four-wheel drive vehicle is zero or less; and (e) a case where the throttle opening degree $\theta$ is a predetermined opening degree KTHEND [not exclusively restricted to the same value as the predetermined opening degree KTHEND in a case of the foregoing (2)] or less.

Figure 15:
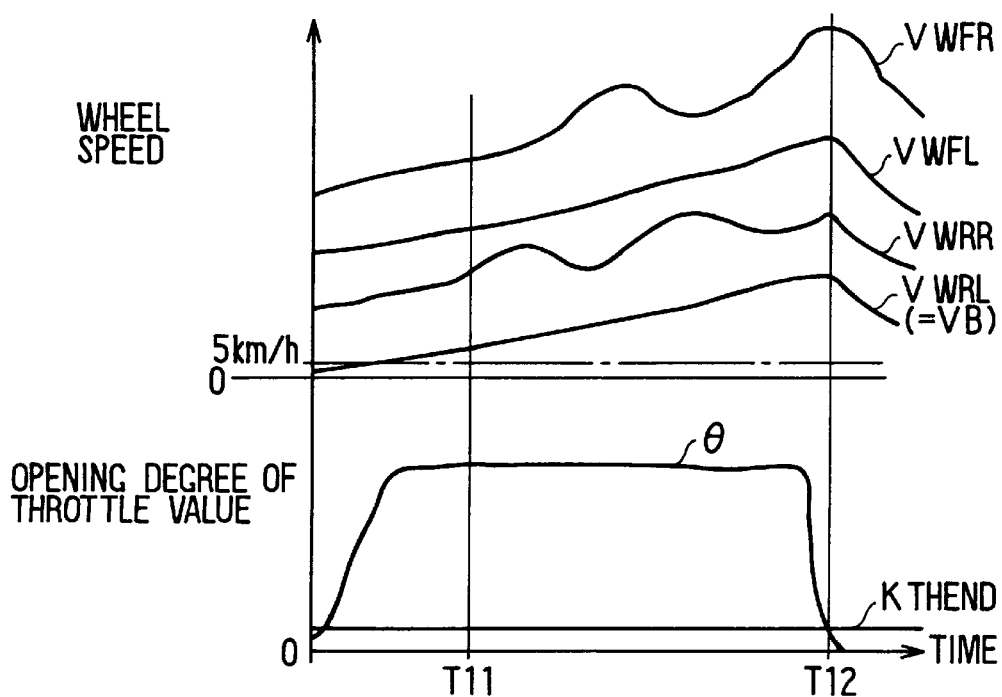
FIG. 15 is a time chart to explain an example of operation of a third embodiment.

For example, FIG. 15 is a timing chart indicating a specific embodiment of a case of the above-described (e). When the vehicle is accelerating ($\theta$>KTHEND), the friction coefficient $\mu$ of the road changes at time T11, a speed differential occurs among the wheels of the four-wheel drive vehicle, and when the brake-fluid pressure corresponding value BP is BP>0 ("YES in step 390 and "NO" in step 400), thereafter, according to driving torque control, braking torque is applied so as to restrain the speed differential and keep the speed differential among the wheels from becoming larger.

During this interval, the vehicle-body speed VB is VB≧5 km/h, but because throttle opening degree θ≦KTHEND does not occur, braking-torque control for differential restraining is not prohibited.

However, when the operator attempts to stabilize speed by relaxing the depression of the accelerator pedal because further acceleration is no longer desired, the throttle opening degree θ becomes smaller, and at time T12, throttle opening degree θ is θ≦KTHEND. At this time, the determination of deceleration in step 370 is performed, and so the ending condition in step 400 is satisfied, and the processing in step 410 is no longer performed. That is to say, braking-torque control for differential restraining is stopped. In this way, an effect similar to the second embodiment can be obtained.

Additionally, the determination of deceleration of step 370 may be carried out as described hereinafter. Namely, in a case of vehicle-body speed VB≧5 km/h, it may be taken into consideration as a condition to determine a deceleration state that the wheel accelerations DVW of the four wheels are all a predetermined wheel acceleration KDVW or less, and moreover, the wheel acceleration DVW of at least one wheel is DVW≦0. KDVW is set at a small positive value at this time. That is to say, when the vehicle body is adjusted to a state of gentle engine braking or the like through operation of the accelerator pedal by the operator, in a case of for example a road straddling differing friction coefficients on the left and right sides under the vehicle body, the wheels on the low-friction side tend to slip due to the braking torque of engine braking and the wheels on the high-friction side tend to increase in wheel speed due to a transfer of the driving torque from the wheels on the low-friction side. At this time, the possibility exists that the wheel acceleration DVW of at least one wheel may assume a positive value, albeit minute, irrespectively of the state of gentle engine braking. However, because braking torque due to engine braking is applied to at least one of the other wheels, the wheel acceleration DVW thereof becomes zero or less. Accordingly, the wheel acceleration DVW of all wheels being less than or equal to the predetermined wheel acceleration KDVW and the wheel acceleration DVW of at least one wheel being less than or equal to zero may be used as the condition for determining the deceleration state. Further, because vehicle-body acceleration becomes negative during engine braking, the wheel acceleration DVW of at least one wheel becomes negative, and the wheel acceleration DVW of all wheels being less than or equal to the predetermined wheel acceleration KDVW and the wheel acceleration DVW of at least one wheel being less than zero (DVW<0) may be taken to be the condition to determine the deceleration state.

Further, an engine-braking state, or a state of constant-speed travel, or the like has been considered as a state wherein the operator has not requested acceleration, but irrespectively of this, a state wherein acceleration of a predetermined amount or more has not been requested may be utilized as the condition for determining deceleration in step 370. That is to say, in a case of vehicle-body speed VB≧5 km/h, whether the wheel accelerations DVW of all wheels are a minute, positive predetermined wheel acceleration value LDVW or less may solely be regarded information to determine the deceleration state. In essence, it is sufficient to perform control of differential restraining by braking in a case where the operator requests favorable travel performance and acceleration performance. Therefore, when the wheel acceleration of all wheels is small, it can be confirmed that the operator has not requested much acceleration, and it is acceptable not to perform control of differential restraining by braking.

What is claimed is:

1. A driving-torque control method for a four-wheel drive vehicle comprising the steps of:

determining a wheel-behavior differential of each of a plurality of wheels of the four-wheel drive vehicle with another wheel as a parameter for brake-adjustment use;

adjusting driving torque conveyed from an engine to respective wheels with braking torque on a basis of said parameter for brake-adjustment use to restrain said wheel-behavior differential; and reducing output of said engine in a case where said braking torque is excessive.

2. A driving-torque control method for a four-wheel drive vehicle as recited in claim 1, further comprising the steps of:

determining a wheel-behavior differential of all wheels as a parameter for engine-output adjustment use; and determining said braking torque to be excessive on a basis of said parameter for engine-output adjustment use.

3. A driving-torque control method for a four-wheel drive vehicle as recited in claim 2, wherein said step of adjusting driving torque controls braking torque in correspondence with a differential between said parameter for brake-adjustment use and a predetermined determination value for brake-adjustment use when said parameter for brake-adjustment use has become larger than said predetermined determination value for brake-adjustment use, and further comprising a step of adjusting said engine output in correspondence with a differential between said parameter for engine-output adjustment use and a predetermined determination value for engine-output adjustment use when said step of determining said braking torque determines that said braking torque is excessive in a case where said parameter for engine-output adjustment use has become larger than said predetermined determination value for engine-output adjustment use which is larger than said predetermined determination value for brake-adjustment use.

4. A driving-torque control method for a four-wheel drive vehicle as recited in claim 2, wherein said parameter for engine-output adjustment use is a differential between a maximum speed and a minimum speed among all wheels.

5. A driving-torque control method for a four-wheel drive vehicle as recited in claim 3, wherein:

said determination value for brake-adjustment use is provided on each wheel; and said determination value for engine-output adjustment use is established to be larger by a predetermined value than said determination parameter for brake-adjustment use provided on a wheel of maximum speed.

6. A driving-torque control method for a four-wheel drive vehicle as recited in claim 5, wherein said parameter for engine-output adjustment use is equivalent with said parameter for brake-adjustment use.

7. A driving-torque control method for a four-wheel drive vehicle as recited in claim 1, wherein said parameter for brake-adjustment use is a value comprising a differential between speed of a wheel itself and speed of another wheel on a same side longitudinally, plus a value obtained by subtracting average speed of two wheels on an opposite side longitudinally from said average of said wheel itself and said other wheel.

8. A driving-torque control method for a four-wheel drive vehicle as recited in claim 1, wherein said engine is an internal combustion engine, and reduction of output of said engine is accomplished by reducing an intake-air amount of said internal combustion engine.

9. A driving-torque control method for a four-wheel drive vehicle as recited in claim 1, wherein said engine is an internal combustion engine, and reduction of output of said engine is accomplished by reducing a fuel-feed amount of said internal combustion engine.

10. A driving-torque control apparatus for a four-wheel drive vehicle, comprising:

braking torque controlling means for determining a wheel-behavior differential of each of a plurality of wheels of a four-wheel drive vehicle with another wheel as a parameter for brake-adjustment use, and for adjusting driving torque conveyed from an engine to respective wheels with braking torque on a basis of said parameter for brake-adjustment use so as to restrain said wheel-behavior differential;

braking torque determining means for determining whether braking torque adjusted by said braking-torque controlling means is excessive;

engine output adjusting means for adjusting output of said engine; and engine output controlling means for controlling said engine-output adjusting means so that output of said engine is reduced when said braking torque is determined by said braking-torque determining means to be excessive.

11. A driving-torque control apparatus for a four-wheel drive vehicle as recited in claim 10, wherein said braking-torque determining means comprises:

engine-output adjustment use parameter calculating means for calculating a wheel-behavior differential of all wheels as a parameter for engine-output adjustment use; and excessiveness determining means for determining excessiveness of said braking torque on a basis of said parameter for engine-output adjustment use calculated by said engine-output adjustment use parameter calculating means.

12. A driving-torque control apparatus for a four-wheel drive vehicle as recited in claim 11, wherein said braking-torque controlling means comprises:

brake-adjustment use parameter determining means for determining whether said parameter for brake-adjustment use has become larger than a predetermined determination value for brake-adjustment use; and braking torque adjusting means for adjusting said braking torque in correspondence with a differential between said parameter for brake-adjustment use and said determination value for brake-adjustment use in a case where it has been determined by said brake-adjustment use parameter determining means that said parameter for brake-adjustment use has become larger than said determination value for brake-adjustment use, wherein said excessiveness determining means determines said braking torque to be excessive in a case where said parameter for engine-output adjustment use has become larger than a predetermined determination value for engine-output adjustment use larger than said determination value for brake-adjustment use, and wherein said engine-output controlling means reduces said engine output in correspondence with a differential between said parameter for engine-output adjustment use and said determination value for engine-output adjustment use in a case where it has been determined by said excessiveness-determining means that said braking torque is excessive.

13. A driving-torque control apparatus for a four-wheel drive vehicle as recited in claim 11, wherein said parameter for engine-output adjustment use is a differential between a maximum speed and a minimum speed among all wheels.

14. A driving-torque control apparatus for a four-wheel drive vehicle as recited in claim 12, wherein said determination value for brake-adjustment use is provided on each wheel, and said determination value for engine-output adjustment use is established to be larger by a predetermined value than said determination parameter for brake-adjustment use provided on a wheel of maximum speed.

15. A driving-torque control apparatus for a four-wheel drive vehicle as recited in claim 14, wherein said parameter for engine-output adjustment use is equivalent with said determination parameter for brake-adjustment use.

16. A driving-torque control apparatus for a four-wheel drive vehicle as recited in claim 10, wherein said parameter for brake-adjustment use is a value comprising a differential between speed of a wheel itself and speed of another wheel on a same side longitudinally, plus a value obtained by subtracting average speed of two wheels on an opposite side longitudinally from said average of said wheel itself and said other wheel.

17. A driving-torque control apparatus for a four-wheel drive vehicle as recited in claim 10, wherein said engine is an internal combustion engine and said engine-output adjusting means performs adjustment of an intake-air amount of said internal combustion engine, and said engine-output controlling means accomplishes reduction of output of said engine by causing an intake-air amount of said internal combustion engine to be reduced by said engine-output adjusting means.

18. A driving-torque control apparatus for a four-wheel drive vehicle as recited in claim 10, wherein said engine is an internal combustion engine and said engine-output adjusting means performs adjustment of a fuel-feed amount of said internal combustion engine, and said engine-output controlling means accomplishes reduction of output of said engine by causing a fuel-feed amount of said internal combustion engine to be reduced by said engine-output adjusting means.

19. A driving-torque control method for a four-wheel drive vehicle comprising the steps of:

determining a speed differential of each of a plurality of wheels of a four-wheel drive vehicle with another wheel as a speed differential for brake-adjustment use;

adjusting driving torque conveyed from an engine to respective wheels with braking torque determined on a basis of said speed differential for brake-adjustment use so as to restrain said speed differential; and prohibiting control of said speed differential by said step of adjusting driving torque in a case where a running state of said four-wheel drive vehicle is a running state that acceleration has not been requested by an operator.

20. A driving-torque control method for a four-wheel drive vehicle as recited in claim 19, wherein said running state wherein acceleration has not been requested by said operator is a state wherein a deceleration operation is being performed by said operator.

21. A driving-torque control method for a four-wheel drive vehicle as recited in claim 20, wherein said deceleration operation is a braking operation.

22. A driving-torque control method for a four-wheel drive vehicle as recited in claim 21, wherein said braking operation is a depressing operation of a brake pedal.

23. A driving-torque control method for a four-wheel drive vehicle as recited in claim 21, wherein said braking operation is detected when brake-fluid pressure generated by operation of a brake pedal is higher than a predetermined value.

24. A driving-torque control method for a four-wheel drive vehicle as recited in claim 20, wherein said state wherein deceleration operation is being performed is a state wherein slippage accompanying deceleration of wheel rotational speed occurs at one or more wheel among wheels of said four-wheel drive vehicle.

25. A driving-torque control method for a four-wheel drive vehicle as recited in claim 19, wherein said running state wherein acceleration has not been requested by an operator is a running state wherein an acceleration operation is not being performed.

26. A driving-torque control method for a four-wheel drive vehicle as recited in claim 25, wherein said running state wherein an acceleration operation is not being performed is a state wherein respective rotational accelerations of all wheels of said four-wheel drive vehicle are all zero or less.

27. A driving-torque control method for a four-wheel drive vehicle as recited in claim 25, wherein said running state wherein an acceleration operation is not being performed is a state wherein vehicle-body acceleration of said four-wheel drive vehicle is zero or less.

28. A driving-torque control method for a four-wheel drive vehicle as recited in claim 25, wherein said running state wherein an acceleration operation is not being performed is a state wherein control performed with respect to said engine is control to maintain or to lower engine output.

29. A driving-torque control method for a four-wheel drive vehicle as recited in claim 25, wherein said engine is an internal combustion engine, and said running state wherein an acceleration operation is not being performed is a state wherein an opening degree of a throttle valve is a predetermined opening degree or less.

30. A driving-torque control method for a four-wheel drive vehicle as recited in claim 19, wherein said step of prohibiting control of said speed differential prohibits control of said speed differential by braking torque if vehicle-body acceleration of said four-wheel drive vehicle is zero or less, control performed with respect to said engine is control to maintain or to lower engine output, and a deceleration operation is being performed during startoff of said four-wheel drive vehicle.

31. A driving-torque control method for a four-wheel drive vehicle as recited in claim 19, wherein control of said speed differential by braking torque is executed preferentially at a rear wheel rather than at a front wheel.

32. A storage medium, wherein said driving-torque control method for a four-wheel drive vehicle as recited in claim 19 is stored as a program executed by a computer system.

33. A driving-torque control apparatus for a four-wheel drive vehicle, comprising:
braking torque controlling means for determining a speed differential of each of a plurality of wheels of a four-wheel drive vehicle with another wheel as a speed differential for brake-adjustment use, and for adjusting driving torque conveyed from an engine to respective wheels with braking torque determined on a basis of said speed differential for brake-adjustment use so as to restrain said speed differential;
running-state detecting means for detecting a running state of said four-wheel drive vehicle;
acceleration-nonrequesting determining means for determining whether a running state of said four-wheel drive vehicle detected by said running-state detecting means is a running state wherein acceleration has not been requested by an operator; and
speed-differential control prohibiting means for prohibiting control of said speed differential by said braking-torque controlling means in a case where a running state of said four-wheel drive vehicle detected by said running-state detecting means is determined by said acceleration-nonrequesting determining means to be a running state wherein acceleration has not been requested by said operator.

34. A driving-torque control apparatus for a four-wheel drive vehicle as recited in claim 33, wherein said running-state detecting means detects a deceleration operation as a running state of said four-wheel drive vehicle, and said running state, determined by said acceleration-nonrequesting determining means, wherein acceleration has not been requested by an operator is a state wherein an operation for deceleration is detected by said running-state detecting means.

35. A driving-torque control apparatus for a four-wheel drive vehicle as recited in claim 34, wherein said running-state detecting means detects a braking operation as said operation for deceleration, and said running state wherein acceleration has not been requested by an operator determined by said acceleration-nonrequesting determining means is a state wherein said braking operation is detected by said running-state detecting means.

36. A driving-torque control apparatus for a four-wheel drive vehicle as recited in claim 35, wherein said running-state detecting means detects a depressing operation of a brake pedal as said operation for deceleration, and said running state wherein acceleration has not been requested by an operator determined by said acceleration-nonrequesting determining means is a state wherein said depressing operation of said brake pedal is detected by said running-state detecting means.

37. A driving-torque control apparatus for a four-wheel drive vehicle as recited in claim 33, wherein said running-state detecting means detects brake-fluid pressure generated by operation of a brake pedal, and said running state wherein acceleration has not been requested by an operator determined by said acceleration-nonrequesting determining means is a state wherein said brake-fluid pressure is detected by said running-state detecting means to be higher than a predetermined value.

38. A driving-torque control apparatus for a four-wheel drive vehicle as recited in claim 33, wherein said running-state detecting means detects respective rotational speeds and respective slipping states of all wheels, said running state wherein acceleration has not been requested by an operator determined by said acceleration-nonrequesting determining means is a state wherein slippage accompanying deceleration of wheel rotational speed occurring at one or more wheel among wheels of said four-wheel drive vehicle is detected by said running-state detecting means.

39. A driving-torque control apparatus for a four-wheel drive vehicle as recited in claim 33, wherein said running-state detecting means detects an operation for acceleration, and said running state wherein acceleration has not been requested by an operator determined by said acceleration-nonrequesting determining means is a state wherein said operation for acceleration is detected by said running-state detecting means.

40. A driving-torque control apparatus for a four-wheel drive vehicle as recited in claim 33, wherein said running-state detecting means detects respective rotational accelerations of all wheels, and said running state wherein acceleration has not been requested by an operator determined by said acceleration-nonrequesting determining means is a state wherein rotational accelerations of all wheels of said four-wheel drive vehicle are detected by said running-state detecting means to all be zero or less.

41. A driving-torque control apparatus for a four-wheel drive vehicle as recited in claim 33, wherein said running-state detecting means detects vehicle-body acceleration of said four-wheel drive vehicle, and said running state wherein acceleration has not been requested by an operator determined by said acceleration-nonrequesting determining means is a state wherein said vehicle-body acceleration detected by said running-state detecting means is zero or less.

42. A driving-torque control apparatus for a four-wheel drive vehicle as recited in claim 33, wherein said running-state detecting means detects an operation with respect to said engine, and said running state wherein acceleration has not been requested by an operator determined by said acceleration-nonrequesting determining means is a state wherein an operation performed with respect to said engine is an operation to maintain or to lower engine output.

43. A driving-torque control apparatus for a four-wheel drive vehicle as recited in claim 33, wherein said engine is an internal combustion engine, said running-state detecting means detects an opening degree of a throttle valve for said internal combustion engine, and said running state wherein acceleration has not been requested by an operator determined by said acceleration-nonrequesting determining means is a state wherein said throttle opening degree is a predetermined opening degree is or less.

44. A driving-torque control apparatus for a four-wheel drive vehicle as recited in claim 33, wherein said running-state detecting means detects vehicle-body acceleration of said four-wheel drive vehicle, an operation with respect to said engine, and an operation for deceleration, and when a state wherein vehicle-body acceleration of said four-wheel drive vehicle detected by said running-state detecting means is zero or less, operation performed with respect to said engine is detected by said running-state detecting means to be operation to maintain or to lower engine output, and moreover said operation for deceleration is detected by said running-state detecting means during startoff of said four-wheel drive vehicle is utilized as said running state wherein acceleration has not been requested by an operator determined by said acceleration-nonrequesting determining means.

45. A driving-torque control apparatus for a four-wheel drive vehicle as recited in claim 33, wherein said running-state detecting means detects respective rotational accelerations of all wheels, and said running state wherein acceleration has not been requested by an operator determined by said acceleration-nonrequesting determining means is a state wherein rotational accelerations of all wheels of said four-wheel drive vehicle are detected by said running-state detecting means to all be a predetermined value or less.

46. A driving-torque control apparatus for a four-wheel drive vehicle as recited in claim 33, wherein said running-state detecting means detects respective rotational accelerations of all wheels, and said running state wherein acceleration has not been requested by an operator determined by said acceleration-nonrequesting determining means is a state wherein rotational accelerations of all wheels of said four-wheel drive vehicle are detected by said running-state detecting means to all be a minute, positive predetermined value or less, and moreover rotational acceleration of at least one wheel is smaller than zero.

47. A driving-torque control apparatus for a four-wheel drive vehicle as recited in claim 33, wherein said braking-torque controlling means executes control of said speed differential by braking torque preferentially at a rear wheel rather than at a front wheel.

\* \* \* \* \*